US 9,065,777 B2

(12) United States Patent
Stanwood et al.

(10) Patent No.: US 9,065,777 B2
(45) Date of Patent: *Jun. 23, 2015

(54) SYSTEMS AND METHODS FOR PRIORITIZING AND SCHEDULING PACKETS IN A COMMUNICATION NETWORK

(71) Applicant: Cygnus Broadband, Inc., San Diego, CA (US)

(72) Inventors: Kenneth L. Stanwood, Vista, CA (US); David Gell, San Diego, CA (US); Yiliang Bao, San Diego, CA (US)

(73) Assignee: Wi-LAN Labs, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/155,138

(22) Filed: Jan. 14, 2014

(65) Prior Publication Data

US 2014/0126364 A1    May 8, 2014

Related U.S. Application Data

(63) Continuation of application No. 13/396,503, filed on Feb. 14, 2012, now Pat. No. 8,665,724, which is a
(Continued)

(51) Int. Cl.
*H04W 24/00* (2009.01)
*H04L 12/28* (2006.01)
(Continued)

(52) U.S. Cl.
CPC ............ *H04L 47/62* (2013.01); *H04L 47/2458* (2013.01); *H04L 47/6275* (2013.01);
(Continued)

(58) Field of Classification Search
USPC .......................... 370/230, 235, 252, 392, 412
See application file for complete search history.

(56) References Cited

U.S. PATENT DOCUMENTS 5,996,019 A    11/1999  Hauser et al.
6,219,339 B1    4/2001  Doshi et al.
(Continued)

FOREIGN PATENT DOCUMENTS

CN    101005453 A    7/2007
CN    101217499 A    7/2008
WO    2006068445 A1  6/2006

OTHER PUBLICATIONS

"Information technology—Coding of audio visual objects—Part 12: ISO base media file format, Amendment 3: Dash support and RTP reception hint track processing", ISO/IEC 14496-12, Jan. 28, 2011, 43 pages.
(Continued)

*Primary Examiner* — Andrew Lee
(74) *Attorney, Agent, or Firm* — Procopio, Cory, Hargreaves & Savitch LLP

(57) ABSTRACT

Systems and methods provide a parameterized scheduling system that incorporates end-user application awareness and can be used with scheduling groups that contain data streams from heterogeneous applications. Individual data queues within a scheduling group can be created based on application class, specific application, individual data streams or some combination thereof. Application information and Application Factors (AF) are used to modify scheduler parameters such as weights and credits to differentiate between data streams assigned to a scheduling group. Dynamic AF settings may adjust relative importance of user applications to maximize user Quality of Experience (QoE) in response to recurring network patterns, one-time events, application characteristics, protocol characteristics, device characteristics, service level agreements, or combinations thereof. Scheduling parameters may be dynamic and incorporate the notions of "duration neglect" and "recency effect" in an end-user's perception of video quality in order to optimally manage video traffic during periods of congestion.

25 Claims, 18 Drawing Sheets

Related U.S. Application Data continuation-in-part of application No. 13/236,308, filed on Sep. 19, 2011, which is a continuation-in-part of application No. 13/166,660, filed on Jun. 22, 2011, which is a continuation-in-part of application No. 13/155,102, filed on Jun. 7, 2011, now Pat. No. 8,627, 396, said application No. 13/166,660 is a continuation-in-part of application No. 13/813,856, filed on Jun. 11, 2010, now Pat. No. 8,068,440.

(60) Provisional application No. 61/421,510, filed on Dec. 9, 2010, provisional application No. 61/186,707, filed on Jun. 12, 2009, provisional application No. 61/187,113, filed on Jun. 15, 2009, provisional application No. 61/187,118, filed on Jun. 15, 2009.

(51) Int. Cl.
| | |
|---|---|
| *H04L 12/863* | (2013.01) |
| *H04L 12/833* | (2013.01) |
| *H04L 12/865* | (2013.01) |
| *H04N 21/262* | (2011.01) |
| *H04N 21/643* | (2011.01) |
| *H04N 21/647* | (2011.01) |
| *H04L 12/867* | (2013.01) |
| *H04W 72/12* | (2009.01) |

(52) U.S. Cl.
CPC .......... *H04L47/629* (2013.01); *H04L 47/6295* (2013.01); *H04W 72/1242* (2013.01); *H04N 21/262* (2013.01); *H04N 21/64322* (2013.01); *H04N 21/64707* (2013.01); *H04N 21/64723* (2013.01); *H04N 21/64784* (2013.01)
USPC ........................... 370/235; 370/252; 370/412

(56) References Cited

U.S. PATENT DOCUMENTS

| | | | |
|---|---|---|---|
| 6,262,986 B1 | 7/2001 | Oba et al. | |
| 6,438,134 B1 | 8/2002 | Chow et al. | |
| 6,480,911 B1 | 11/2002 | Lu | |
| 6,603,738 B1 | 8/2003 | Kari et al. | |
| 6,654,374 B1 | 11/2003 | Fawaz et al. | |
| 7,551,623 B1 | 6/2009 | Feroz et al. | |
| 7,643,418 B1 | 1/2010 | Varier et al. | |
| 7,680,139 B1 | 3/2010 | Jones et al. | |
| 7,899,068 B1 | 3/2011 | Ma et al. | |
| 8,385,210 B1 | 2/2013 | Weill et al. | |
| 8,462,628 B2 | 6/2013 | Wynne | |
| 8,532,030 B2 | 9/2013 | Koc et al. | |
| 2001/0046208 A1 | 11/2001 | Eng et al. | |
| 2002/0114277 A1 | 8/2002 | Kyusojin | |
| 2003/0065809 A1 | 4/2003 | Byron | |
| 2003/0067878 A1 | 4/2003 | Zboril | |
| 2003/0081624 A1 | 5/2003 | Aggarwal et al. | |
| 2003/0179774 A1 | 9/2003 | Saidi et al. | |
| 2003/0198204 A1 | 10/2003 | Taneja et al. | |
| 2003/0231590 A1* | 12/2003 | Zhao et al. | 370/230.1 |
| 2004/0001493 A1* | 1/2004 | Cloonan et al. | 370/395.42 |
| 2004/0013089 A1 | 1/2004 | Taneja et al. | |
| 2004/0073692 A1 | 4/2004 | Gentle et al. | |
| 2004/0190459 A1 | 9/2004 | Ueda et al. | |
| 2004/0203832 A1 | 10/2004 | An | |
| 2005/0021806 A1 | 1/2005 | Richardson et al. | |
| 2005/0114867 A1 | 5/2005 | Xu et al. | |
| 2005/0180351 A1 | 8/2005 | Peric | |
| 2005/0220097 A1* | 10/2005 | Swami et al. | 370/389 |
| 2005/0281278 A1* | 12/2005 | Black et al. | 370/412 |
| 2006/0098680 A1 | 5/2006 | Kelesoglu et al. | |
| 2006/0165111 A1 | 7/2006 | Varma | |
| 2006/0165172 A1 | 7/2006 | Koh et al. | |
| 2006/0171480 A1 | 8/2006 | Erving et al. | |
| 2006/0221934 A1 | 10/2006 | Cooke et al. | |
| 2006/0242319 A1 | 10/2006 | Sang et al. | |
| 2007/0025357 A1* | 2/2007 | Zhang et al. | 370/395.4 |
| 2007/0038753 A1 | 2/2007 | Jorgensen | |
| 2007/0086485 A1 | 4/2007 | Vega-Garcia et al. | |
| 2007/0104210 A1 | 5/2007 | Wu et al. | |
| 2007/0189169 A1* | 8/2007 | Wu et al. | 370/235 |
| 2008/0065706 A1 | 3/2008 | Miller | |
| 2008/0112343 A1* | 5/2008 | Oleszczuk | 370/310 |
| 2008/0126803 A1 | 5/2008 | Ginter et al. | |
| 2008/0177973 A1 | 7/2008 | Bauman et al. | |
| 2008/0212473 A1 | 9/2008 | Sankey et al. | |
| 2008/0267140 A1 | 10/2008 | Lee et al. | |
| 2008/0281979 A1 | 11/2008 | Keeler | |
| 2008/0291935 A1 | 11/2008 | Campion et al. | |
| 2009/0010202 A1 | 1/2009 | Masayuki et al. | |
| 2009/0010350 A1 | 1/2009 | Lee et al. | |
| 2009/0067328 A1 | 3/2009 | Morris et al. | |
| 2009/0185618 A1 | 7/2009 | Liu et al. | |
| 2009/0193484 A1 | 7/2009 | Zhang et al. | |
| 2009/0225771 A1 | 9/2009 | Yasuda | |
| 2009/0312045 A1 | 12/2009 | Miller et al. | |
| 2010/0067400 A1 | 3/2010 | Dolganow et al. | |
| 2010/0118883 A1 | 5/2010 | Jones et al. | |
| 2010/0138920 A1 | 6/2010 | Kim et al. | |
| 2010/0157981 A1 | 6/2010 | Dawson | |
| 2010/0216467 A1 | 8/2010 | Ryan et al. | |
| 2010/0232370 A1 | 9/2010 | Jing et al. | |
| 2010/0232371 A1 | 9/2010 | Jing et al. | |
| 2010/0232396 A1 | 9/2010 | Jing et al. | |
| 2010/0232447 A1 | 9/2010 | Jing et al. | |
| 2011/0019574 A1 | 1/2011 | Malomsoky et al. | |
| 2011/0069616 A1 | 3/2011 | Revels | |
| 2011/0116460 A1 | 5/2011 | Kovvali et al. | |
| 2011/0122887 A1 | 5/2011 | Ma et al. | |
| 2011/0154327 A1 | 6/2011 | Kozat et al. | |
| 2011/0235630 A1 | 9/2011 | Hui et al. | |
| 2011/0235653 A1 | 9/2011 | Ma | |
| 2011/0305138 A1 | 12/2011 | Huomo et al. | |
| 2012/0089794 A1 | 4/2012 | Seelam et al. | |
| 2012/0134264 A1 | 5/2012 | Ludwig et al. | |
| 2012/0155398 A1 | 6/2012 | Oyman et al. | |
| 2012/0281536 A1 | 11/2012 | Gell et al. | |
| 2013/0242888 A1 | 9/2013 | Das et al. | |
| 2014/0198700 A1* | 7/2014 | Kim et al. | 370/311 |

OTHER PUBLICATIONS

[MS-Smth]: IIS Smooth Streaming Transport Protocol, Microsoft Corporation, Sep. 8, 2009, 55 pages.
"Advanced Systems Format (ASF) Specification", Microsoft, Revision Jan. 20, 2005, Jun. 2010, 110 pages.
"Cisco ASR 5000 Multimedia Core Platform", Cisco datasheet, Cisco Systems, Inc., 2010, 4 pages.
"Optimizing Enterprise Video Over Wireless LAN", Cisco Systems, Inc., 2010, White Paper, 11 pages.
"Protocol Analysis of PPlive and PPstream by Internet Measurement", Yunfei Zhang, China Mobile, Mar. 23, 2009, 13 pages.
Adobe Flash Video File Format Specification, Version 10.1, Aug. 2010, 89 pages.
ANSI T1.801.03-2003, "American National Standard for Telecommunications—Digital Transport of One-Way Video Signals—Parameters for Objective Performance Assessment." (No Copy Available to Applicant).
David W. Petr et al., "Priority Discarding of Speech in Integrated Packet Networks," IEEE Journal on Selected Areas in Communications, vol. 7, No. 5, Jun. 1989, Abstract, 1 page.
Dynamic adaptive streaming over HTTP (DASH), MPEG System Technologies, Part 6, ISO/IEC (FCD) 23001-6, Jan. 28, 2011, 86 pages.
F. Qian et al., "Characterizing Radio Resource Allocation for 3G Networks", Nov. 2010, 14 pages.
Flash Media Manifest File Format Specification, OSMF.org, Jun. 28, 2010, version 1.01, http://osmf.org/dev/osmf/ specpdfs/ FlashMediaManifestFileFormatSpecification.pdf, 5 pages.
HTTP Dynamic Streaming on the Adobe Flash Platform, Adobe, Sep. 2010, 18 pages.

(56) References Cited

OTHER PUBLICATIONS http://wiki.theory.org/BitTorrentSpecification, last modified Jun. 7, 2011, 25 pages.
International Search Report and Written Opinion issued Feb. 1, 2011 in PCT/US2010/038357, 11 pages.
International Search Report and Written Opinion issued in corresponding PCT/US2011/053493 on Apr. 9, 2012, 9 pages.
International Search Report and Written Opinion issued in corresponding PCT/US2011/053495 on Feb. 9, 2012, 8 pages.
ITS Video Quality Research Video Quality Metric (VQM) website, http://www.its.bldrdoc.gov/n3/video/standards/index.php, accessed Aug. 3, 2011, 3 pages.
ITU-R Rec. BT.500-12, "Methodology for the subjective assessment of the quality of television pictures", BT Series, Broadcasting service (television), Sep. 2009, 46 pages.
John A. Bocharov et al., "Portable encoding of audio-video objects, The Protected Interoperable File Format (PIFF)", Microsoft Corporation, First Edition Sep. 8, 2009, Revised Mar. 9, 2010, 32 pages.
Kotikalapudi Sriram et al., "Voice Packetization and Compression in Broadband ATM Networks," IEEE Journal on Selected Areas in Communications, vol. 9, No. 3, Apr. 1991, Abstract, 1 page.
M. Baugher et al., "The Secure Real-time Transport Protocol (SRTP)", Network Working Group, RFC 3711, Standards Track, Mar. 2004, 57 pages.
Mylène C. Q. Farias, "Video Quality Metrics", Department of Computer Science, University of Brasilia (UnB), Brazil, Feb. 2010, 30 pages.
Nanying Yin et al., "Congestion Control for Packet Voice by Selective Packet Discarding," IEEE Trans. on Communications, May 1990, vol. 38, No. 5, Abstract, 1 page.
PSS: Progressive Download and Dynamic Adaptive Streaming over HTTP (3GP-DASH), 3GPP Release 10, TS 26.247 V10.1.0, Nov. 2010, 92 pages.
R. Fielding et al., "Hypertext Transfer Protocol—HTTP/1.1", Network Working Group, Standards Track, Jun. 1999, 157 pages.
R. Pantos et al., "HTTP Live Streaming draft-pantos-http-live-streaming-05", Apple Inc., IETF draft, Nov. 19, 2010, 23 sheets.
S. Kumar et al., "Error Resiliency Schemes in H.264/AVC Standard", Elsevier Inc., Aug. 24, 2005, 26 pages.
Series J: Cable Networks and Transmission of Television, Sound Programme and Other Multimedia Signals, "Objective perceptual video quality measurement techniques for digital cable television in the presence of a full reference", ITU-T Rec. J.144, Mar. 2004, 156 pages.
Series J: Cable Networks and Transmission of Television, Sound Programme and Other Multimedia Signals, Measurement of the quality of service, "Objective perceptual multimedia video quality measurement in the presence of a full reference", ITU-T Rec. J.247, Aug. 2008, 108 pages.
Series J: Cable Networks and Transmission of Television, Sound Programme and Other Multimedia Signals, Measurement of the quality of service, "Perceptual audiovisual quality measurement techniques for multimedia services over digital cable television networks in the presence of a reduced bandwidth reference", ITU-T Rec. J.246, Aug. 2008, 42 pages.
Series P: Telephone Transmission Quality, Telephone Installations, Local Line Networks, Audiovisual quality in multimedia services, "Subjective video quality assessment methods for multimedia applications", ITU-T Rec. P.910, Apr. 2008, 42 pages.
Singh et al. "Video Capacity and QoE Enhancements over LTE." Presented at the IEEE ICC 2012 in Ottawa, Canada on Jun. 15, 2012, 20 pages.
Thomas Stockhammer, "Dynamic Adaptive Streaming over HTTP—Design Principles and Standards", Qualcomm Incorporated, accessed on Aug. 11, 2011, 3 pages.
V. Vukadinovic, "Mobility and opportunistic resource allocation in wireless multimedia networks", Doctoral Thesis, Stockholm, Sweden, 2010, 46 pages.
Z. Wang et al., "Image quality assessment: From error visibility to structural similarity", IEEE Transactions on Image Processing, vol. 13, No. 4, Apr. 2004, 14 pages.
International Search Report and Written Opinion issued in corresponding PCT/US2011/043888 on Jan. 24, 2013, 12 pages.
Office Action and Search Report (with English translation) for related CN Patent Application No. 201280033901X, mailed Nov. 3, 2014, in 7 pages.
Extended European Search Report for related EP Patent Application No. 12803041.8, dated Apr. 14, 2015, in 9 pages.

* cited by examiner

| Application Class | Specific Application |
|---|---|
| Video chat | iChat-video |
| | Skype-video |
| Video stream | Youtube |
| | Netflix |
| Voice | Skype |
| | Vonage |
| Gaming | NOVA |
| | Alive 4-ever |

| Application Class | Specific Application | Application Factor |
|---|---|---|
| Video chat | Unknownvideo chat | 7 |
| | iChat (video) | 5 |
| | Skype (video) | 8 |
| Video stream | Unknown video stream | 5 |
| | Youtube | 4 |
| | Netflix | 7 |
| Voice | Unknown voice | 1 |
| | Skype (audio) | 8 |
| | Vonage | 6 |
| Gaming | Unknown gaming | 4 |
| | NOVA | 4 |
| | Alive 4-ever | 4 |
| Social networking | Unknown social networking | 2 |
| | Facebook | 2 |
| | Twitter | 1 |
| Background Data | Unknown background data | 0 |
| | Email | 0 |
| | Search | 1 |

FIG. 8

| Stream Index (i) | Application Class | Specific Application | AF | Prior Art W(q=1) | W1(q=i) | W2(q=i) |
|---|---|---|---|---|---|---|
| 1 | Social Networking | Facebook | 2 | 3 | 4.0 | 5.0 |
| 2 | Voice | Vonage | 6 | 3 | 6.0 | 9.0 |
| 3 | Background Data | Email | 0 | 3 | 3.0 | 3.0 |
| 4 | Video Chat | Skype | 8 | 3 | 7.0 | 11.0 |
| 5 | Gaming | NOVA | 4 | 3 | 5.0 | 7.0 |

FIG. 9

SYSTEMS AND METHODS FOR PRIORITIZING AND SCHEDULING PACKETS IN A COMMUNICATION NETWORK

CROSS-REFERENCE TO RELATED APPLICATIONS

This application is continuation of U.S. patent application Ser. No. 13/396,503 entitled "SYSTEMS AND METHODS FOR PRIORITIZING AND SCHEDULING PACKETS IN A COMMUNICATION NETWORK," filed on Feb. 14, 2012, which is a continuation-in-part of U.S. patent application Ser. No. 13/236,308 entitled "SYSTEMS AND METHODS FOR PRIORITIZING AND SCHEDULING PACKETS IN A COMMUNICATION NETWORK," filed on Sep. 19, 2011, which are incorporated herein by reference. U.S. patent application Ser. No. 13/236,308 is a continuation-in-part of U.S. patent application Ser. No. 13/166,660 entitled "SYSTEMS AND METHODS FOR PRIORITIZING AND SCHEDULING PACKETS IN A COMMUNICATION NETWORK," filed on Jun. 22, 2011, which is incorporated herein by reference. U.S. patent application Ser. No. 13/166,660 is a continuation in part of U.S. patent application Ser. No. 13/155,102 entitled "SYSTEMS AND METHODS FOR PRIORITIZATION OF DATA FOR INTELLIGENT DISCARD IN A COMMUNICATION NETWORK," filed Jun. 7, 2011, now U.S. Pat. No. 8,627,396, which claims the benefit of U.S. provisional patent application Ser. No. 61/421,510 entitled "SYSTEMS AND METHODS FOR INTELLIGENT DISCARD IN A COMMUNICATION NETWORK," filed on Dec. 9, 2010, which are hereby incorporated by reference. U.S. patent application Ser. No. 13/166,660 is also a continuation in part of U.S. patent application Ser. No. 12/813,856 entitled "SYSTEMS AND METHODS FOR INTELLIGENT DISCARD IN A COMMUNICATION NETWORK," filed on Jun. 11, 2010, now U.S. Pat. No. 8,068,440, which claims the benefit of U.S. provisional patent application Ser. No. 61/186,707 entitled "SYSTEM AND METHOD FOR INTERACTIVE INTELLIGENT DISCARD IN A COMMUNICATION NETWORK," filed on Jun. 12, 2009, U.S. provisional patent application Ser. No. 61/187,113 entitled "SYSTEM AND METHOD FOR REACTIVE INTELLIGENT DISCARD IN A COMMUNICATION NETWORK," filed on Jun. 15, 2009, and U.S. provisional patent application Ser. No. 61/187,118 entitled "SYSTEM AND METHOD FOR PROACTIVE INTELLIGENT DISCARD IN A COMMUNICATION NETWORK," filed on Jun. 15, 2009, which are hereby incorporated by reference.

BACKGROUND

The present invention generally relates to the field of communication systems and to systems and methods for optimizing system performance through weight-based or credit-based scheduling in capacity and spectrum constrained, multiple-access communication systems.

In a communication network, such as an Internet Protocol (IP) network, each node and subnet has limitations on the amount of data which can be effectively transported at any given time. In a wired network, this is often a function of equipment capability. For example, a Gigabit Ethernet link can transport no more than 1 billion bits of traffic per second. In a wireless network the capacity is limited by the channel bandwidth, the transmission technology, and the communication protocols used. A wireless network is further constrained by the amount of spectrum allocated to a service area and the quality of the signal between the sending and receiving systems. Because these aspects can be dynamic, the capacity of a wireless system may vary over time.

SUMMARY

Systems and methods for providing a parameterized scheduling system that incorporates end-user application awareness are provided. The systems and methods disclosed herein can include communication systems having scheduling groups that contain data streams from heterogeneous applications. Some embodiments use packet inspection to classify data traffic by end-user application. Individual data queues within a scheduling group can be created based on application class, specific application, individual data streams or some combination thereof. Embodiments use application information in conjunction with Application Factors (AF) to modify scheduler parameters (such as weights, credits, or debits), thereby differentiating the treatment of data streams assigned to a scheduling group. In an embodiment, a method for adjusting the relative importance of different user applications through the use of dynamic AF settings is provided to maximize user Quality of Experience (QoE) in response to recurring network patterns, one-time events, application characteristics, or a combination of any of them.

In an embodiment, a method for operating a communication device for scheduling transmission of data packets is provided. The method includes: receiving a plurality of data packets from a communication network; determining at least one application that is associated with at least one of the data packets; inserting each of the data packets into one of a plurality of data queues; determining a scheduler parameter for one or more of the plurality of data queues, the scheduler parameter corresponding to the at least one application; scheduling the data packets from one or more of the plurality of data queues to an output queue based at least in part on the scheduler parameter for the one or more of the plurality of data queues; and transmitting the data packets from the output queue to the communication network.

In another embodiment, a communication device is provided. The communication device includes: a classification and queuing module configured to receive a plurality of data packets and to output each of the data packets into one of a plurality of data queues, the classification and queuing module comprising a packet inspection module configured to analyze attributes of the data packets, to determine at least one application associated with at least one of the data packets, and to output information about the at least one application; a scheduler parameter calculation module configured to calculate and output a scheduler parameter for one or more of the plurality of data queues, the scheduler parameter corresponding to the at least one application; and a scheduler module configured to select the data packets from one or more of the plurality of data queues in an order based at least in part on the scheduler parameter for the one or more of the plurality of data queues and to insert the selected data packets into an output queue for transmission over a physical communication layer.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 8 is a table illustrating sample AF assignments on per Application Class and per Specific Application basis according to an embodiment;

FIG. 9 is a table illustrating enhanced weight factor calculations according to an embodiment;

DETAILED DESCRIPTION

Systems and methods for providing a parameterized scheduling system that incorporates end-user application awareness are provided. The systems and methods disclosed herein can be used with scheduling groups that contain data streams from heterogeneous applications. Some embodiments use packet inspection to classify data traffic by end-user application. Individual data queues within a scheduling group can be created based on application class, specific application, individual data streams or some combination thereof. Embodiments use application information in conjunction with Application Factors (AF) to modify scheduler parameters, thereby differentiating the treatment of data streams assigned to a scheduling group. In an embodiment, a method for adjusting the relative importance of different user applications through the use of dynamic AF settings is provided to maximize user QoE in response to recurring network patterns, one-time events, or both. In an embodiment, a method for maximizing user QoE for video applications by dynamically managing scheduling parameters is provided. This method incorporates the notions of "duration neglect" and "recency effect" in an end-user's perception of video quality (i.e. video QoE) in order to optimally manage video traffic during periods of congestion.

The systems and methods disclosed herein can be applied to various capacity-limited communication systems, including but not limited to wireline and wireless technologies. For example, the systems and methods disclosed herein can be used with Cellular 2G, 3G, 4G (including Long Term Evolution ("LTE"), LTE Advanced, WiMax), WiFi, Ultra Mobile Broadband ("UMB"), cable modem, and other wireline or wireless technologies. Although the phrases and terms used herein to describe specific embodiments can be applied to a particular technology or standard, the systems and methods described herein are not limited to these specific standards.

Basic Deployments

Figure 1:
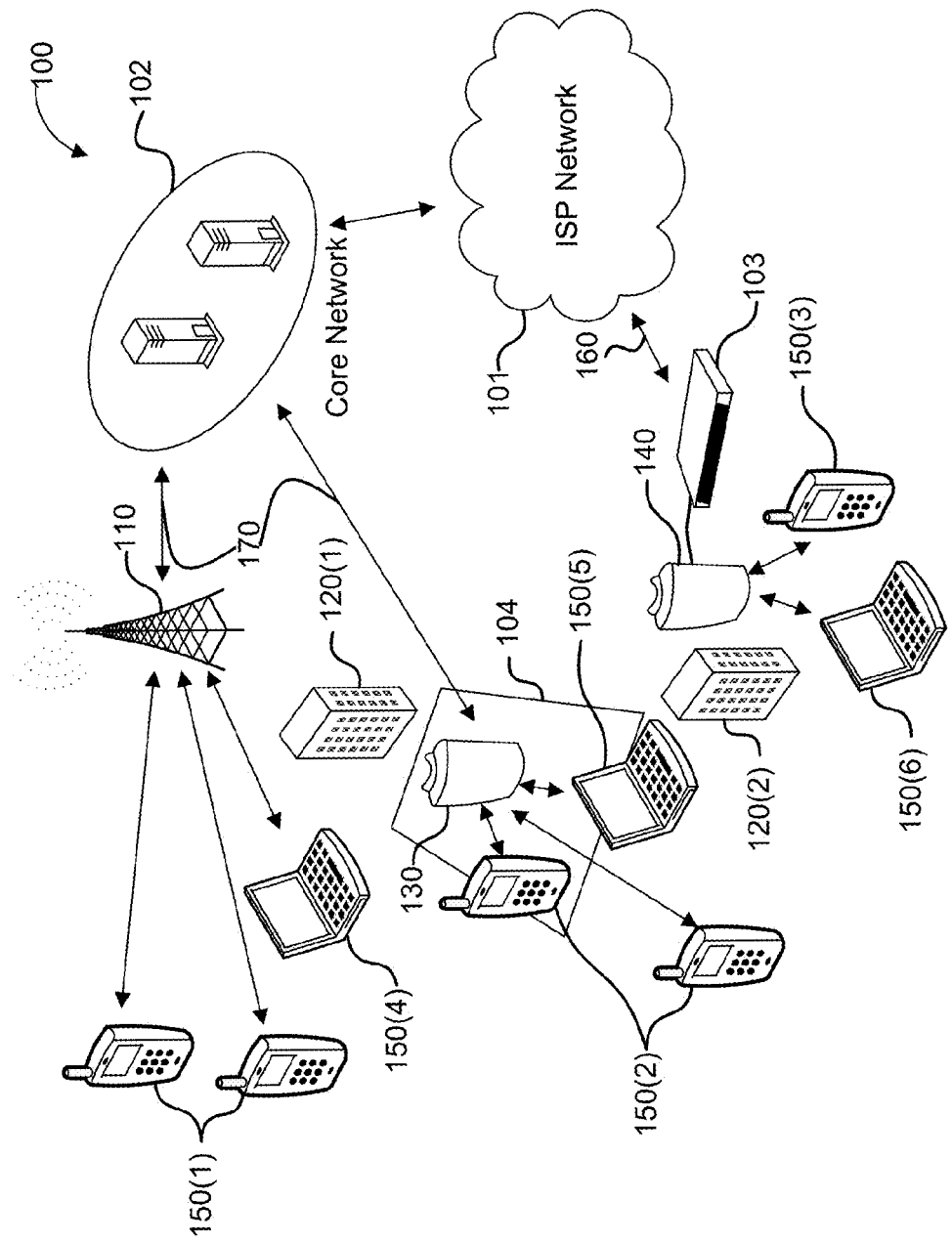
FIG. 1 is a block diagram of a wireless communication network in which the systems and methods disclosed herein can be implemented according to an embodiment.

FIG. 1 is a block diagram of a wireless communication network in which the systems and methods disclosed herein can be implemented according to an embodiment. FIG. 1 illustrates a typical basic deployment of a communication system that includes macrocells, picocells, and enterprise femtocells. In a typical deployment, the macrocells can transmit and receive on one or many frequency channels that are separate from the one or many frequency channels used by the small form factor (SFF) base stations (including picocells and enterprise or residential femtocells). In other embodiments, the macrocells and the SFF base stations can share the same frequency channels. Various combinations of geography and channel availability can create a variety of interference scenarios that can impact the throughput of the communications system.

FIG. 1 illustrates an example of a typical picocell and enterprise femtocell deployment in a communications network 100. Macro base station 110 is connected to a core network 102 through a backhaul connection 170. Subscriber stations 150(1) and 150(4) can connect to the network through macro base station 110. Subscriber stations are sometimes referred to as user equipment (UE), users, user devices, handsets, or terminals. In the network configuration illustrated in FIG. 1, office building 120(1) causes a coverage shadow 104. Pico station 130, which is connected to core network 102 via backhaul connection 170, can provide coverage to subscriber stations 150(2) and 150(5) in coverage shadow 104.

In office building 120(2), enterprise femtocell 140 provides in-building coverage to subscriber stations 150(3) and 150(6). Enterprise femtocell 140 can connect to core network 102 via ISP network 101 by utilizing broadband connection 160 provided by enterprise gateway 103.

Figure 2A:
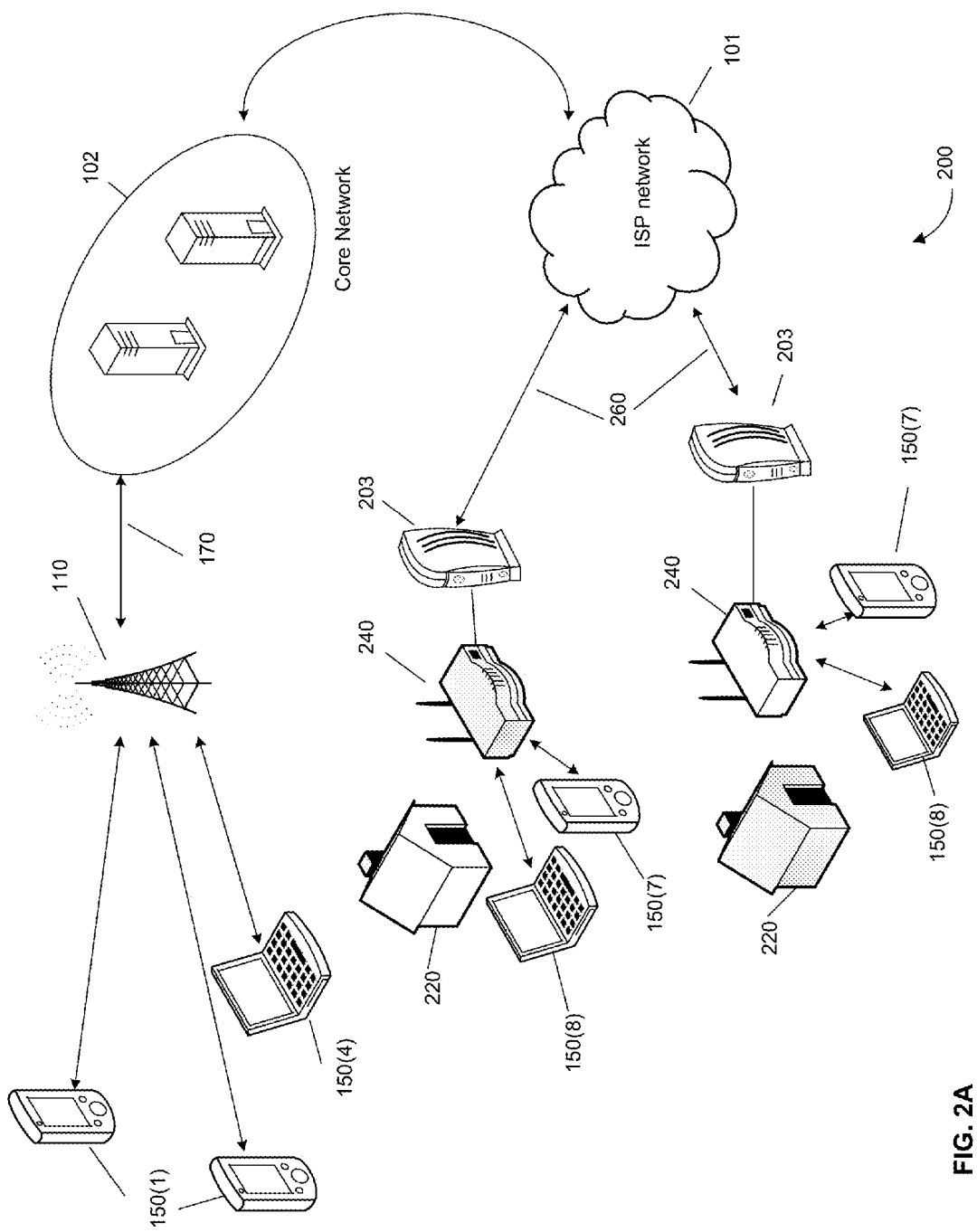
FIG. 2A is block diagram of another wireless communication network in which the systems and methods disclosed herein can be implemented according to an embodiment.

FIG. 2A is a block diagram of another wireless communication network in which the system and methods disclosed herein is implemented according to an embodiment. FIG. 2A illustrates a typical basic deployment in a communications network 200 that includes macrocells and residential femtocells deployed in a residential environment. Macrocell base station 110 is connected to core network 102 through backhaul connection 170. Subscriber stations 150(1) and 150(4) can connect to the network through macro base station 110. Inside residences 220, residential femtocell 240 can provide in-home coverage to subscriber stations 150(7) and 150(8).

Residential femtocells 240 can connect to core network 102 via ISP network 101 by utilizing broadband connection 260 provided by cable modem or DSL modem 203.

Data networks (e.g. IP), in both wireline and wireless forms, have minimal capability to reserve capacity for a particular connection or user, and therefore demand may exceed capacity. This congestion effect may occur on both wired and wireless networks.

During periods of congestion, network devices must decide which data packets are allowed to travel on a network, i.e. which traffic is forwarded, delayed or discarded. In a simple case, data packets are added to a fixed length queue and sent on to the network as capacity allows. During times of network congestion, the fixed length queue may fill to capacity. Data packets that arrive when the queue is full are typically discarded until the queue is drained of enough data to allow queuing of more data packets. This first-in-first-out (FIFO) method has the disadvantage of treating all packets with equal fairness, regardless of user, application or urgency. This is an undesirable response as it ignores that each data stream can have unique packet delivery requirements, based upon the applications generating the traffic (e.g. voice, video, email, internet browsing, etc.). Different applications degrade in different manners and with differing severity due to packet delay and/or discard. Thus, a FIFO method is said to be incapable of managing traffic in order to maximize an end user's experience, often termed Quality of Experience (QoE).

In response, technologies have been developed to categorize packets and to treat data streams (defined herein as the stream of packets from a single, user application, for example a YouTube video) with differing levels of importance and/or to manage to differentiated levels of service.

Figure 2B:
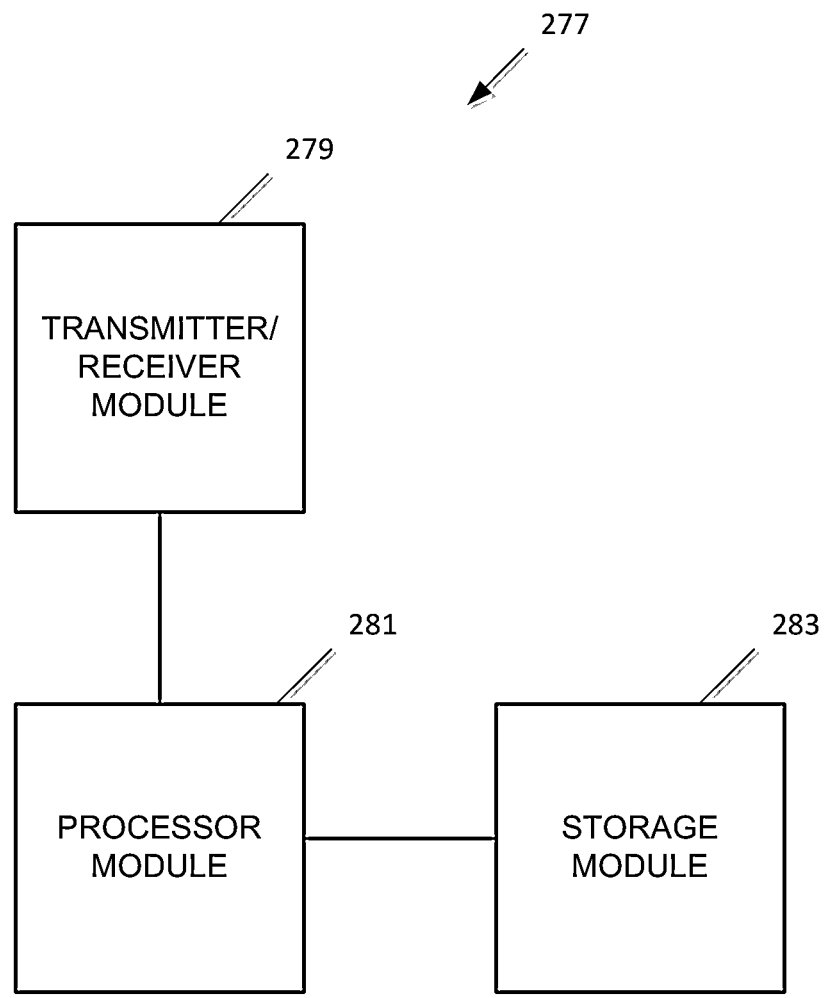
FIG. 2B is a functional block diagram of a station according to an embodiment.

FIG. 2B is a functional block diagram of a station 277. In some embodiments, the station 277 is a wireless or wireline access node, such as a base station, an LTE eNB (Evolved Node B, which is also often referred to as eNodeB), a UE, a terminal device, a network switch, a network router, a gateway, subscriber station, or other network node (e.g., the macro base station 110, pico station 130, enterprise femtocell 140, enterprise gateway 103, residential femtocell 240, cable modem or DSL modem 203, or subscriber stations 150 shown in FIGS. 1 and 2A). The station 277 comprises a processor module 281 communicatively coupled to a transmitter receiver module (transceiver) 279 and to a storage module 283. The transmitter receiver module 279 is configured to transmit and receive communications with other devices. In one embodiment, the communications are transmitted and received wirelessly. In such embodiments, the station 277 generally includes one or more antennae for transmission and reception of radio signals. In another embodiment, the communications are transmitted and received over wire. In many embodiments, the station 277 transmits and receives communications via another communication channel in addition to the transmitter receiver module 279. For example, communications received via the transmitter receiver module 279 in a base station may be transmitted, after processing, on a backhaul connection. Similarly, communication received from the backhaul connection may be transmitted by the transmitter receiver module 279.

The processor module 281 is configured to process communications being received and transmitted by the station 277. The storage module 283 is configured to store data for use by the processor module 281. In some embodiments, the storage module 283 is also configured to store computer readable instructions for accomplishing the functionality described herein with respect to the station 277. In one embodiment, the storage module 283 includes a non-transitory machine readable medium. For the purpose of explanation, the station 277 or embodiments of it such as the base station, subscriber station, and femto cell, are described as having certain functionality. It will be appreciated that in some embodiments, this functionality is accomplished by the processor module 281 in conjunction with the storage module 283 and transmitter receiver module 279.

Performance Requirements

One method to assign importance and to optimize resource allocation between different data streams is through the use of desired performance requirements. For example, performance requirements may include desired packet throughput, and tolerated latency and jitter. Such performance requirements may be assigned based upon the type of data or supported application. For example, a voice over internet protocol (VoIP) phone call may be assigned the following performance requirements suited for the packet based transmission of voice through an IP network: throughput=32 kilobits per second (kbps), maximum latency=100 milliseconds (ms), and maximum jitter=10 ms. In contrast, a data stream which carries video may require substantially more throughput, but may allow for slightly relaxed latency and jitter performance as follows: throughput=2 megabits per second (Mbps), maximum latency=300 ms, maximum jitter=60 ms.

Scheduling algorithms located at network nodes can use these performance requirements to make packet forwarding decisions in an attempt to best meet each stream's requirements. The sum total of a stream's performance requirements is often described as the quality of service, or QoS, requirements for the stream.

Priority

Another method to assign importance is through the use of relative priority between different data streams. For example, standards such as the IEEE 802.1p and IETF RFC 2474 Diffsery define bits within the IP frame headers to carry such priority information. This information can be used by a network node's scheduling algorithm to make forwarding decisions, as is the case with the IEEE 802.11e wireless standard. Additional characteristics of a packet or data stream can also be mapped to a priority value, and passed to the scheduling algorithm. The standard 802.16e, for example, allows characteristics such as IP source/destination address or TCP/UDP port number to be mapped to a relative stream priority while also considering performance requirements such as throughput, latency, and jitter.

Scheduling Groups

In some systems, data streams may be assigned to a discrete number of scheduling groups, defined by one or more common characteristics of scheduling method, member data streams, scheduling requirements or some combination thereof.

For example, scheduling groups can be defined by the scheduling algorithm to be used on member data streams (e.g. scheduling group #1 may use a proportional fair algorithm, while scheduling group #2 uses a weighted round-robin algorithm).

Alternatively, a scheduling group may be used to group data streams of similar applications (e.g. voice, video or background data). For example, Cisco defines six groups to differentiate voice, video, signaling, background and other data streams. This differentiation of application may be combined with unique scheduling algorithms applied to each scheduling group.

In another example, the Third Generation Partnership Program (3GPP) has established a construct termed QoS Class Identifiers (QCI) for use in the Long Term Evolution (LTE) standard. The QCI system has 9 scheduling groups defined by a combination of performance requirements, scheduler priority and user application. For example, the scheduling group referenced by QCI index=1 is defined by the following characteristics:
(1) Performance Requirements: Latency=100 ms, Packet Loss Rate=10E-2, Guaranteed Bit Rate
(2) Priority: 2
(3) Application: Conversational Voice The term 'class of service' (or CoS) is sometimes used as a synonym for scheduling groups.

Weight-Based Scheduling Systems

In systems as described above, one or more data streams can be assigned an importance and a desired level of performance. This information may be used to assign packets from each data stream to a scheduling group and data queue. A scheduling algorithm can also use this information to decide which queues (and therefore which data streams and packets) to treat preferentially to others in both wired and wireless systems.

In some scheduling algorithms the importance and desired level of service of each queue is conveyed to the scheduler through the use of a scheduling weight. For example, weighted round robin (WRR) and weighted fair queuing (WFQ) scheduling methods both use weights to adjust service among data queues. In some scheduling algorithms the importance and desired level of service of each queue is conveyed to the scheduler through the use of credits and debits. For example, a proportional fair scheduler (PFS) method may use credits and debits to adjust service among data queues. Some algorithms use weights and convert them to credits in the form of number of packets or bytes to be served during a scheduling round.

In WRR, all non-empty queues are serviced in each scheduling round, with the number of data packets served from each queue being proportional to the weight of the queue. The weights may be derived from a variety of inputs such as relative level of service purchased (e.g. gold, silver, or bronze service), minimum guaranteed bit rates (GBR), or maximum allowable bit rates. In one example, three queues may have data pending. The queue weights are 1, 3 and 6 for queues 1, 2 and 3 respectively. If 20 packets are to be served during each round, then queues 1, 2 and 3 would be granted 10%, 30% and 60% of the 20 packet budget or credits of 2, 6 and 12 packets, respectively. One skilled in the art will recognize that other weights can be applied as well and the concepts of weights, credits, and rates can be interchanged.

The WFQ algorithm is similar to WRR in that weighted data queues are established and serviced in an effort to provide a level of fairness across data streams. In contrast to WRR, WFQ serves queues by looking at number of bytes served, rather than number of packets. WFQ works well in systems where data packets may be fragmented into a number of pieces or segments, such as in WiMAX systems. In the example where three queues have data pending with queue weights 1, 3 and 6 for queues 1, 2 and 3 respectively, the weights would translate to credits of 10%, 30%, and 60% of the bandwidth available during that scheduling round.

The PFS algorithm typically uses a function of rates such as GBR or maximum allowable rates to directly calculate credits each queue receives each scheduling round. For instance, if a service is allowed a rate of 768 kilobytes per second, and there are 100 scheduling rounds per second, the service's queue would receive a credit of 7680 bytes per scheduler round. The amount actually allocated to the queue during a scheduler round is debited from the queue's accumulated credit. Credits can be adjusted or accumulated, round-by-round, in an effort to balance the performance requirements of multiple queues. For example, a first queue which has been allocated resources below its minimum GBR specification may have accumulated credits (typically up to some allowable cap) effectively causing its weight to increase in relation to a second queue which has been allocated capacity substantially above its GBR, effectively causing the second queue to accumulate a negative credit, or debit.

Figure 3:
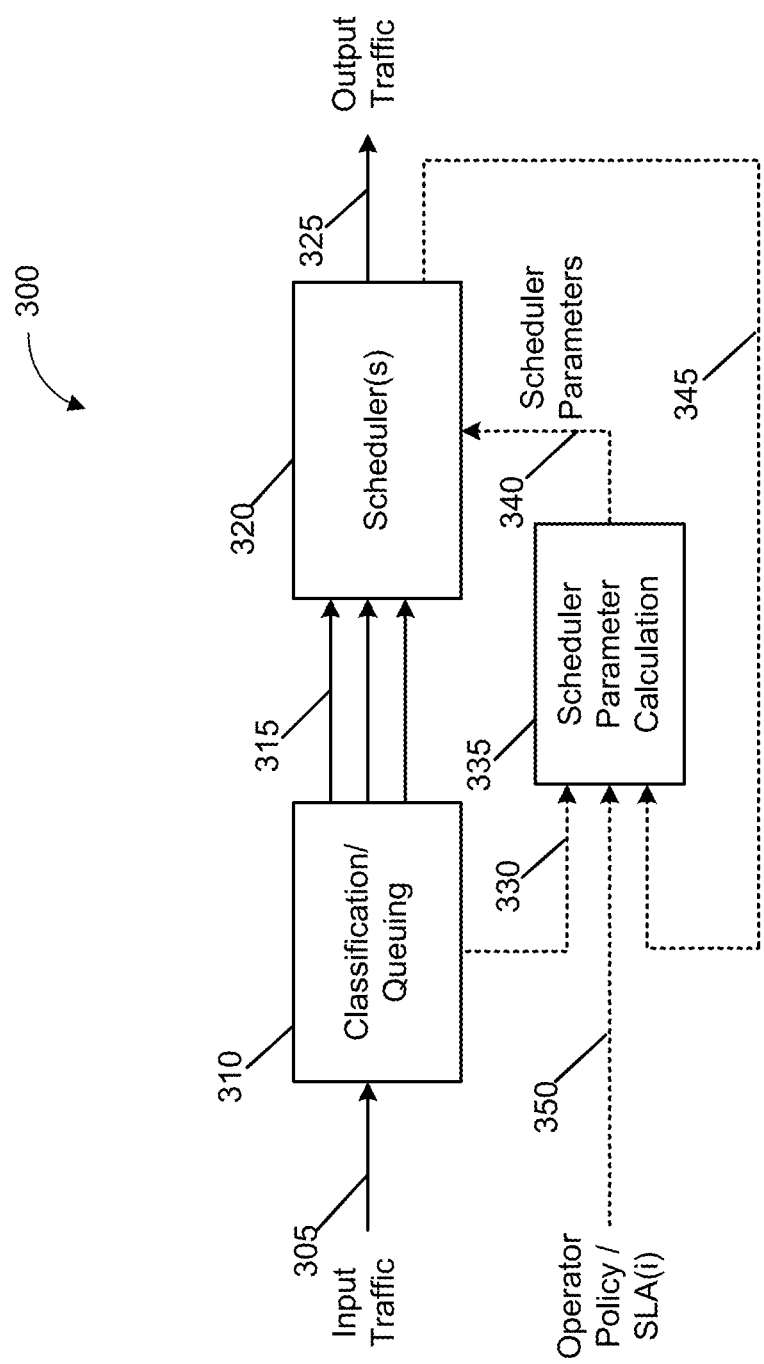
FIG. 3 is a block diagram illustrating a parameterized scheduling system that can be used to implement scheduling techniques according to an embodiment.

FIG. 3 is a block diagram illustrating a parameterized scheduling system 300 that is used to implement the various parameterized scheduling techniques described above as well as the enhanced parameterized scheduling techniques described below according to an embodiment. The parameterized scheduling system illustrated in FIG. 3 can be implemented to use one or more scheduling groups. In one embodiment, the functionality described with respect to the features of FIG. 3 is implemented by the processor module 281 of FIG. 2B.

Input traffic 305 can consist of a heterogeneous set of individual data streams each with unique users, sessions, logical connections, performance requirements, priorities or policies and enters the scheduling system. Classification and queuing module 310 is configured to assess the relative importance and assigned performance requirements of each packet and to assign the packet to a scheduling group and data queue. According to an embodiment, the classification and queuing module 310 is configured to assess the relative importance and assigned performance requirements of each packet using one of the methods described above, such as 802.1p or Diffserv.

According to an embodiment, the parameterized scheduling system 300 is implemented to use one or more scheduling groups and each scheduling group may have one or more data queues associated with the group. According to an embodiment, each scheduling group can include a different number of queues, and each scheduling group can use different methods for grouping packets into queues, or a combination thereof. A detailed description of the mapping between input traffic, scheduling groups and data queues is presented below.

According to an embodiment, classification and queuing module 310 outputs one or more data queues 315 and classification information 330 which is received as an input at scheduler parameter calculation module 335. The phrase "outputs one or more data queues" is intended to encompass populating the data queues and does not require actual transmission or transfer of the queues. According to an embodiment, the classification information 330 can include classifier results, packet size, packet quantity, and/or current queue utilization information. Scheduler parameter calculation module 335 is configured to calculate new scheduler parameters (e.g. weights and/or per scheduler round credits) on a per queue basis. Scheduler parameter calculation module 335 can be configured to calculate the new parameters based on a various inputs, including the classification information 330, optional operator policy and service level agreement (SLA) information 350, and optional scheduler feedback information 345 (e.g., stream history received or resource utilization from scheduler module 320). Scheduler parameter calculation module 335 can then output scheduler parameters 340 to one or more scheduler modules 320.

Scheduler module 320 receives the scheduler parameters 340 and the data queues 315 (or accesses the data queues) output by classification and queuing module 310. Data queues as described herein can be implemented in various ways. For example, they can contain the actual data (e.g., packets) or merely pointers or identifiers of the data (packets). Scheduler module 320 uses the updated scheduler parameters 340 to determine the order in which to forward packets (or fragments of packets) from the data queues 315 to output queue 325, for instance using one of the methods described above such as PFS, WRR or WFQ. In an embodiment, the output queue 325 is implemented as pointers to the data queues 315. The traffic in the output queue 325 is de-queued and fed to the physical communication layer (or 'PHY') for transmission on a wireless or wireline medium.

Figure 4A:
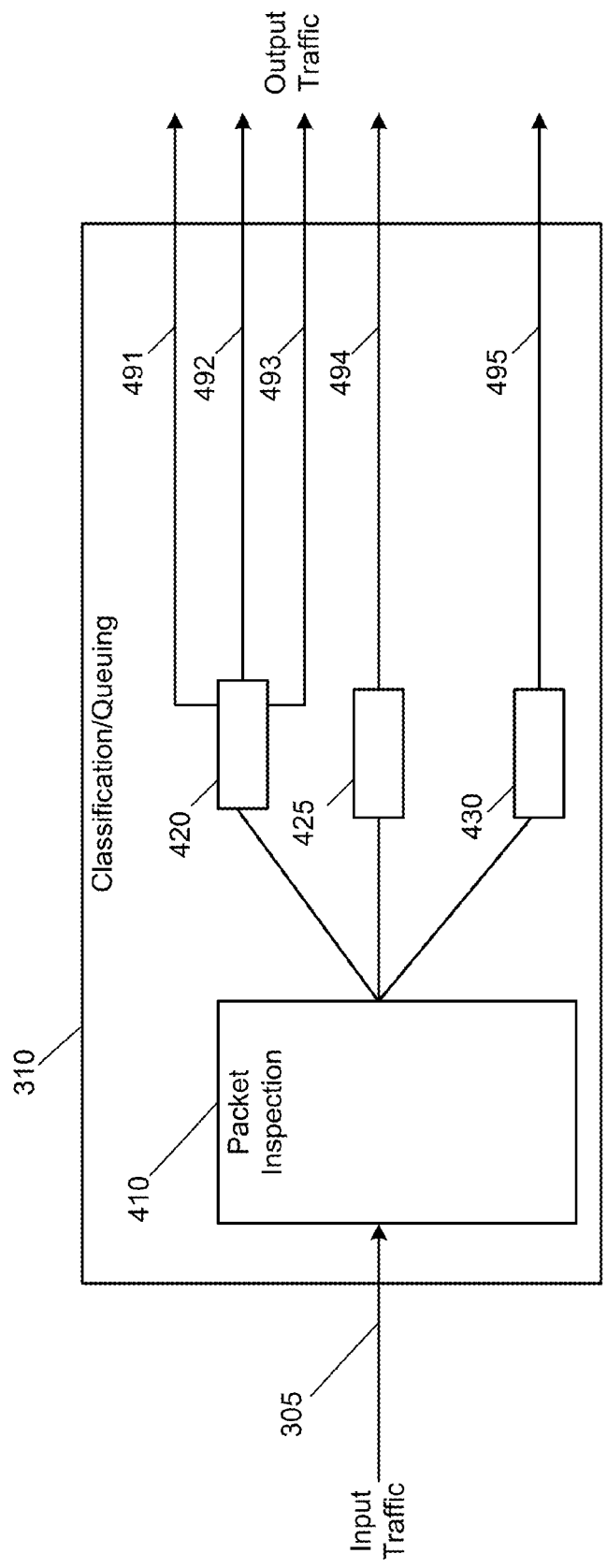
FIG. 4A is a block diagram illustrating the relationship between heterogeneous input traffic and individual queues in a queuing system according to an embodiment.

FIG. 4A is a block diagram illustrating the relationship between heterogeneous input traffic and individual queues in a weight-based queuing system. FIG. 4A illustrates the operation of classification and queuing module 310 illustrated in FIG. 3 in greater detail.

Heterogeneous input traffic 305 is input into packet inspection module 410 which characterizes each packet to assess performance requirements and priority as described above. Based upon this information, each packet is assigned one of three scheduling groups 420, 425 and 430. While the embodiment illustrated in FIG. 4A merely includes three scheduling groups, one skilled in the art will recognize that other embodiments may include a greater or lesser number of scheduling groups. The packets can then be assigned to a data queue (491, 492, 493, 494, or 495) associated with one of the scheduling groups. Packets can be assigned to a specific data queue associated with a scheduling group based on performance requirements, priority, additional user specific policy/SLA settings, unique logical connections or some combination thereof. In one embodiment, the classification and queuing module 310 analyzes packets flowing in two directions, for example, from a client to a server and from the server to the client, and uses information from the packets flowing in one direction to classify the packets flowing in the other direction. The packet inspection module 410 may then receive input traffic from a second direction in addition to the heterogeneous input traffic 305 or may receive information from another inspection module that characterizes packets communicated in the second direction.

In one example, an LTE eNB is configured to assign each QCI to a separate scheduling group (e.g. packets with QCI=9 may be assigned to one scheduling group and packets with QCI=8 assigned to a different scheduling group). Furthermore, packets with QCI=9 may be assigned to individual queues based on user ID, bearer ID, SLA or some combination thereof. For example, each LTE UE may have a default bearer and one or more dedicated bearers. Within the QCI=9 scheduling group, packets from default bearers may be assigned to one queue and packets from dedicated bearers may be assigned a different queue.

Figure 12:
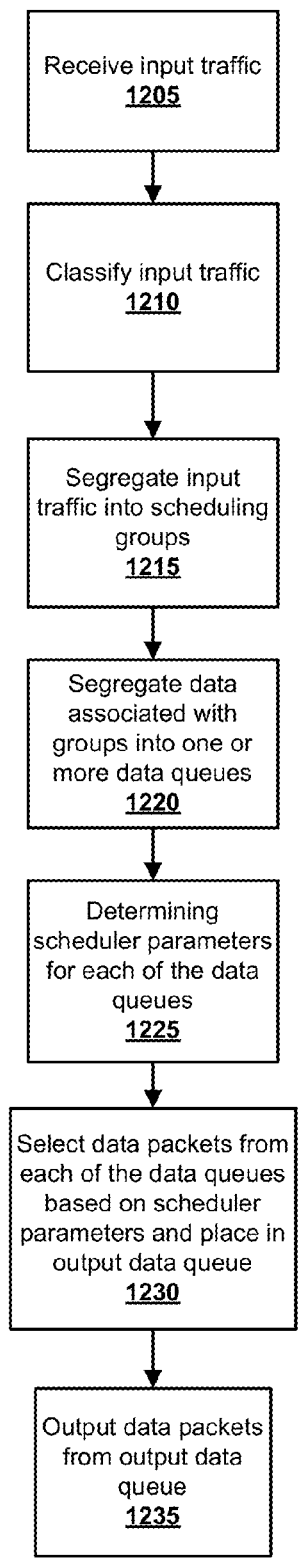
FIG. 12 is a flow diagram of a method for queuing data packets to be transmitted across a network medium using a parameterized scheduling technique according to an embodiment.

FIG. 12 is a flow diagram of a method for queuing data packets to be transmitted across a network medium using a parameterized scheduling technique according to an embodiment. The method illustrated in FIG. 12 can be implemented using the systems illustrated in FIGS. 3 and 4. According to an embodiment, the method illustrated in FIG. 12 is implemented using the various parameterized scheduling techniques described above as well as the enhanced parameterized scheduling techniques described below according to an embodiment.

The method begins with receiving input traffic to be scheduled to be transmitted across a network medium (step 1205). According to an embodiment, the network medium can be a wired or wireless medium. According to an embodiment, the input traffic is input traffic 305 described above. The input traffic can consist of a heterogeneous set of individual data streams each with unique users, sessions, logical connections, performance requirements, priorities or policies. According to an embodiment, classification and queuing module 310 can perform step 1205. According to an embodiment, packet inspection module 410 can perform this assessment step.

The input traffic can then be classified (step 1210). According to an embodiment, classification and queuing module 310 can perform step 1210. In this classification step, the input traffic is assessed to determine relative importance of each packet and to determine if performance requirements have been assigned for each data packet. For instance, in an LTE network, a packet gateway can assign packets to specific logical connections or bearers. This is indicated by assigning the same tunnel ID to packets for the same logical connection (logical channel). The tunnel ID is mapped to an LTE scheduling group (i.e. QCI) when the logical bearer is established. This in turn implies certain performance requirements that are associated with the scheduling group. The tunnel ID may be detected and used to determine performance requirements and scheduling groups and to assign the packet to a queue. Similarly, in WiMAX, a service flow ID may be used for a similar purpose. According to an embodiment, packet inspection module 410 can perform this assessment step. This information can then be used by the classification and queuing module 310 to determine which scheduling groups the data packets should be added.

The input traffic can then be segregated into a plurality of scheduling groups (step 1215). The classification and queuing module 310 can use the information from the classification step to determine a scheduling group into which each data packet should be added. According to an embodiment, packet inspection module 410 of the classification and queuing module 310 can perform this step. According to an embodiment, the relative importance and assigned performance requirements of each packet is assessed using one of the methods described above, such as 802.1p or Diffserv.

The data packets comprising the input traffic can then be inserted into one or more data queues associated with the scheduling groups (step 1220). According to an embodiment, packet inspection module 410 of the classification and queuing module 310 can perform this step.

Scheduler parameters can then be calculated for each of the data queues (step 1225). According to an embodiment, this step is implemented by scheduler parameter calculation module 335. The scheduler parameters for each of the data queues is calculated based on the classification information created in step 1210. The classification information 330 can include classifier results, connection identifier (e.g., tunnel ID, service flow ID, connection ID, bearer ID) packet size, packet quantity, and/or current queue utilization information. The calculation of the scheduler parameters can also take into account other inputs including optional operator policy and service level agreement (SLA) information and optional scheduler feedback information.

Once the data packets have been added to the queues, data packets can be selected from each of the queues based on scheduler parameters (such as weights and credits) associated with those queues and inserted into an output queue (step 1230). The data packets in the output queue can then be de-queued and fed to the physical communication layer (or 'PHY') for transmission on a wireless or wireline medium (step 1235). According to an embodiment, scheduler module 320 can implement steps 1230 and 1235 of this method.

Deficiencies in Some Systems

In WRR, WFQ, PFS or other weight or credit-based algorithms, some systems assign packets to queues and calculate scheduler parameters based on priority, performance requirements, scheduling groups or some combination thereof. There are numerous deficiencies in these approaches.

For example, schedulers that consider performance requirements are typically complex to configure, requiring substantial network operator knowledge and skill, and may not be implemented sufficiently to distinguish data streams from differing applications. This leads to the undesirable grouping of both high and low importance data streams in a single queue or scheduling group. Consider, for example, an IEEE 802.16 network. An uplink (UL) data stream (or service flow) can be defined using a network's gateway IP address (i.e. IP "source address"). In such a case, all data streams "behind" the router, regardless of application or performance requirements are treated the same by the WiMAX UL scheduler policies and parameters.

There are numerous potential deficiencies of a priority-based weight or credit calculation system. The system used to assign priority may not be aware of the user application and in some cases cannot correctly distinguish among multiple data streams being transported to or from a specific user. The priority assignment is static and cannot be adjusted to account for changing network conditions. Priority information can be missing due to misconfiguration of network devices or even stripped due to network operator policy. The number of available priority levels can be limited, for example the IEEE 802.1p standard only allows 8 levels. In addition there can be mismatches due to translation discrepancies from one standard to another as packets are transported across a communication system.

Figure 5:
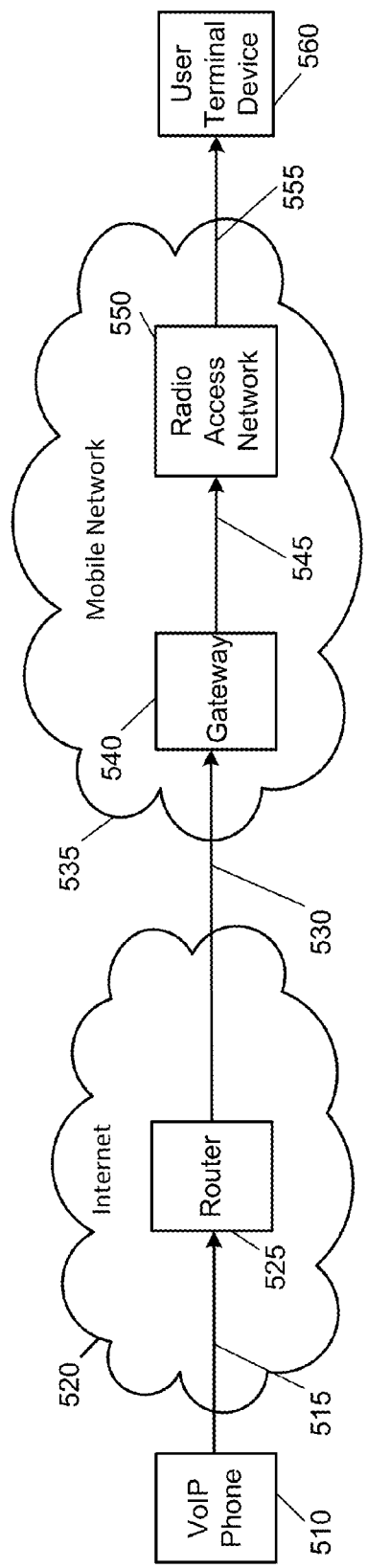
FIG. 5 is a block diagram illustrating a wireless communication system according to an embodiment.

FIG. 5 is a block diagram illustrating a wireless communication system according to an embodiment. In the system illustrated in FIG. 5, a VoIP phone 510 is connected to the Internet 520 via communication link 515. Within the Internet 520 there exists one or more network routers 525 configured to direct traffic to the proper packet destination. In this example, Internet traffic is carried along link 530 into a mobile network 535. Traffic passes through a gateway 540 onto link 545 and into the Radio Access Network 550. The output of 550 is typically a wireless, radio-frequency connection 555 linked to a user terminal 560, such as a cell phone.

A discrepancy between two different priority systems can exist in the example illustrated in FIG. 5. For example, a VoIP phone will often be configured to use the IEEE 802.1p or IETF RFC 2474 ("diffserv") packet marking prioritization system to mark packets with an elevated priority level indicating a certain level of desired treatment. In RFC 2474, for instance, such priority levels fall into one of three categories: default, assured and expedited. Within the latter two categories, there are subcategories relating to the desired, relative performance requirements. Packets generated by the VoIP phone will thus travel on communication links 515 and 530 with such a priority marking. When the packets arrive at the mobile network gateway 540, these priorities need to be translated into the prioritization system established within the mobile network. For example, in an LTE network, mapping to QCI may be performed. This conversion may create problems. For example, the diffsery information may be completely ignored. Or the diffsery information may be used to assign a QCI level inappropriate for voice service. Additionally, the diffsery information may be used to assign a QCI level that is less fine-grained than the diffsery level, thus assigning the VoIP packets the same QCI level as packets from many other applications.

Some systems have combined the concepts of priority and performance requirements in an effort to provide additional information to the scheduling system. For example, in 802.16 the importance of streams (or "services") is defined by a combination of priority value (based on packet markings such as 802.1p) and performance requirements. While a combined system such as 802.16 can provide the scheduler with a richer set of information, the deficiencies described above still apply.

The use of scheduling groups alone or in conjunction with the aforementioned techniques has numerous deficiencies in relation to end user QoE. For example, the available number of groups is limited in some systems which can prevent the fine-grained control necessary to deliver optimal QoE to each user. Additionally, some systems typically utilize a "best effort" group to describe those queues with the lowest importance. Data streams may fall into such a group because they are truly least important but also because such streams have not been correctly classified (intentionally or unintentionally), through the methods described above, as requiring higher importance.

An example of such a problem is the emergence of 'over-the-top' voice and video services. These services provide capability using servers and services outside of the network operator's visibility and/or control. Data streams from an operator owned or sanctioned source, such as operator provided voice or video, may be differentiated onto different service flows, bearers, or connections prior to reaching a wireless access node such as a base station. This differentiation often maps to differentiation in scheduling groups and queues. However services from other sources may all be bundled together onto a default, often best effort, connection or bearer. For example, Skype and Netflix are two internet-based services or applications which support voice and video, respectively. Data streams from these applications can be carried by the data service provided by wireless carriers such as Verizon or AT&T, to whom they may appear as non-prioritized data rather than being identified as voice or video. As such, the packets generated by these applications, when transported through the wireless network, may be treated on a 'best-effort' basis with no priority given to them above typical best-effort services such as web browsing, email or social network updates.

Some systems implement dynamic adjustment of scheduling weights or credits. For example, in order to meet performance requirements such as guaranteed bit rate (GBR) or maximum latency, scheduling weights may be adjusted upward or scheduling credits may accumulate for a particular data stream as its actual, scheduled throughput drops closer to the guaranteed minimum limit. However, this adjustment of weights or credits does not take into account the effect of QoE on the end user. In the previous example, the increase of weight or accumulation of credits to meet GBR limit may result in no appreciable improvement in QoE, yet create a large reduction in QoE for a competing queue with lower weight per scheduling round credit, or accumulated credit (or debit).

Therefore, there is a need for a system and method to improve the differentiation of treatment of data packets streams from heterogeneous applications grouped into the same scheduling group, such as is common for a 'best effort' scheduling group. Additionally, there is a need to extend the information provided to a parameterized scheduler beyond priority and performance requirements in order to maximize user QoE across a network.

Enhanced Classification Techniques

As described above, communication systems can use classification and queuing methods to differentiate data streams based on performance requirements, priority and logical connections.

Figure 4B:
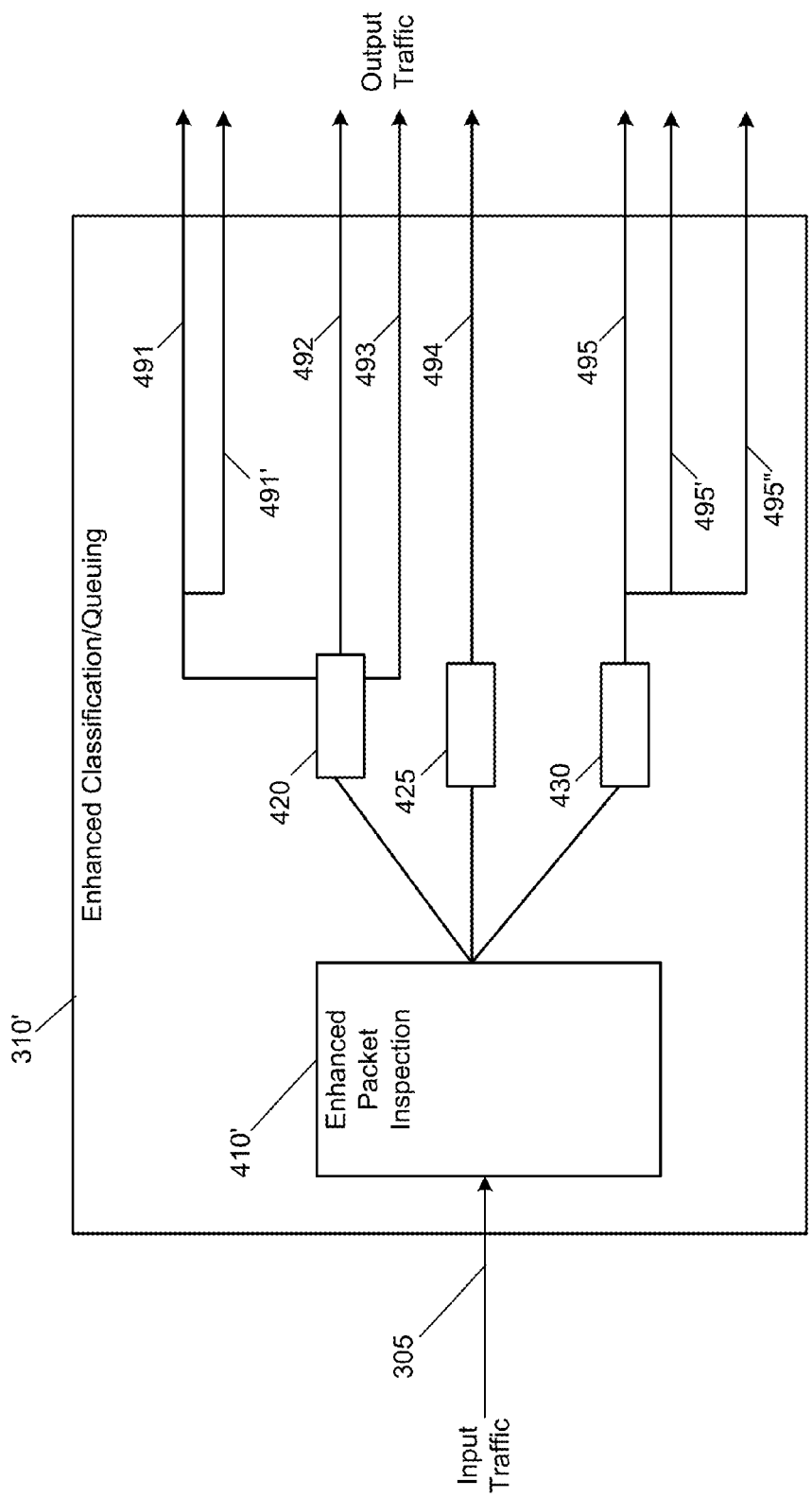
FIG. 4B is a block diagram illustrating an enhanced packet inspection system for use in an enhanced classification/queuing module according to an embodiment.
Figure 4C:
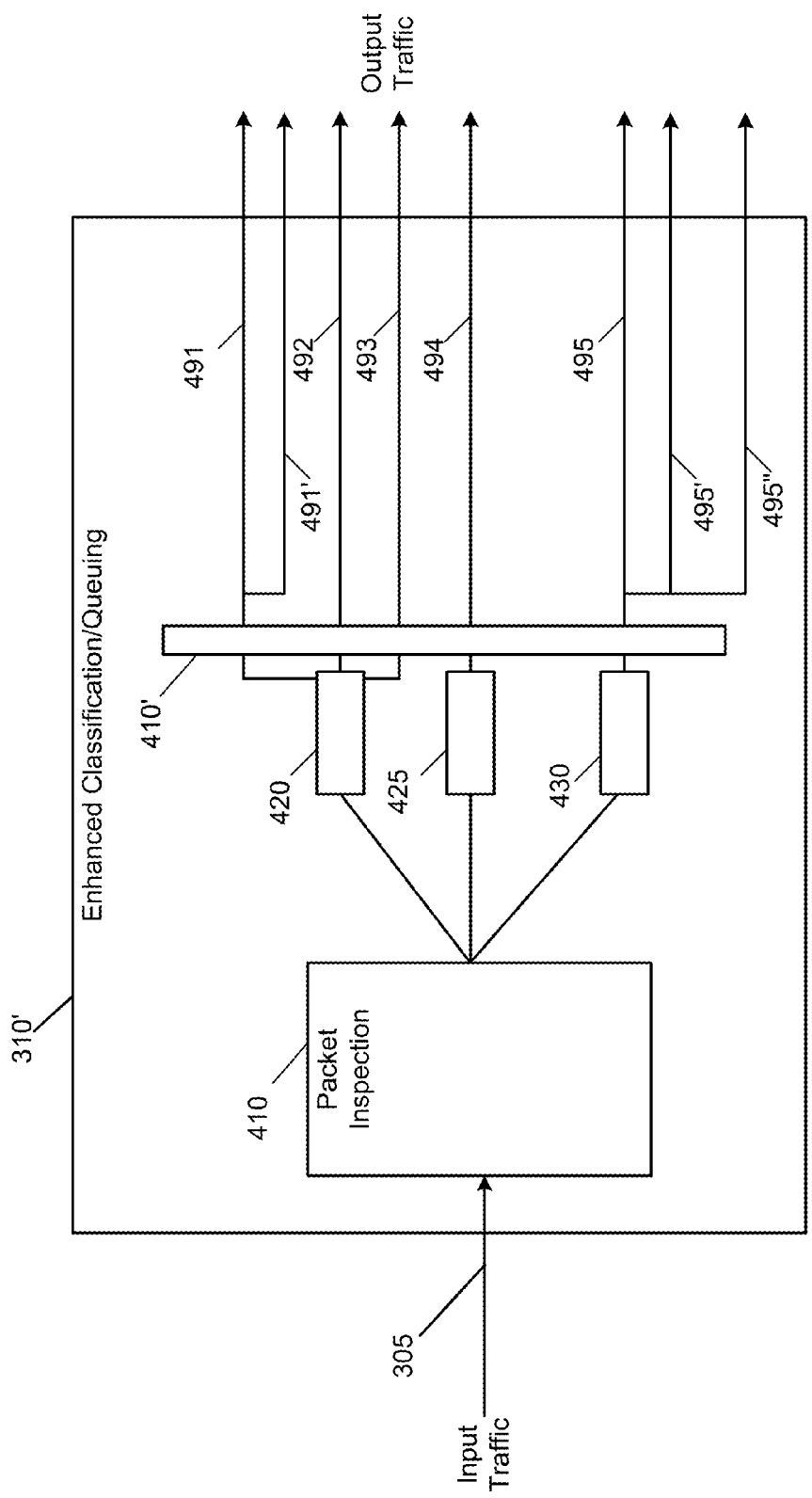
FIG. 4C is a block diagram illustrating an enhanced packet inspection function for use in an enhanced classification/queuing module according to an embodiment.

To address previously noted deficiencies in some systems, the classification and queuing module 310 of FIG. 3 can be enhanced to provide an enhanced classification and queuing module 310' (FIGS. 4B and 4C). According to an embodiment, the functions illustrated in the parameterized scheduling system 300 illustrated in FIG. 3, which may include the enhanced classification and queuing module 310', can be implemented in a single wireless or wireline network node, such as a base station, an LTE eNB, a UE, a terminal device, a network switch a network router, a gateway, or other network node (e.g., the macro base station 110, pico station 130, enterprise femtocell 140, enterprise gateway 103, residential femtocell 240, and cable modem or DSL modem 203 shown in FIGS. 1 and 2A). In other embodiments, the functions illustrated in FIG. 3 can be distributed across multiple network nodes. For example, in an LTE network, enhanced packet inspection could be performed in the EPC Packet Gateway or other core gateway device while the queuing, scheduler parameter calculation module 335 and scheduler module 320 are located in the eNB base station. One skilled in the art would recognize that other functional partitions are similarly possible. The enhanced classification and queuing module 310' can analyze the application class and/or the specific application of each packet and provide further differentiation of data packet streams grouped together by the traditional classification and queuing methods. The enhanced classification may be performed after the traditional classification as a separate step as shown in FIG. 4C, or may be merged into the traditional classification step as shown in FIG. 4B providing more detailed classification for use within scheduling groups.

Except as specifically noted, the elements of FIG. 4B operate as described with respect to FIG. 4A. However, an enhanced packet inspection module 410' performs the enhanced packet inspection techniques described herein. As shown in FIG. 4B, in some embodiments, the enhanced packet inspection module 410' generates additional data queues 491', 495', and 495".

Except as specifically noted, the elements of FIG. 4C operate as described with respect to FIG. 4A. In addition to the packet inspection module 410, an enhanced packet inspection module 410' is provided. In one embodiment, the enhanced packet inspection module 410' operates on data packets that have already been classified into different scheduling groups. While illustrated as separate modules, it will be appreciated that the packet inspection module 410 and enhanced packet inspection module 410' may be implemented as a single module. As shown, in some embodiments, the enhanced packet inspection module 410' generates additional data queues 491', 495', and 495".

Figures 6, 7A:
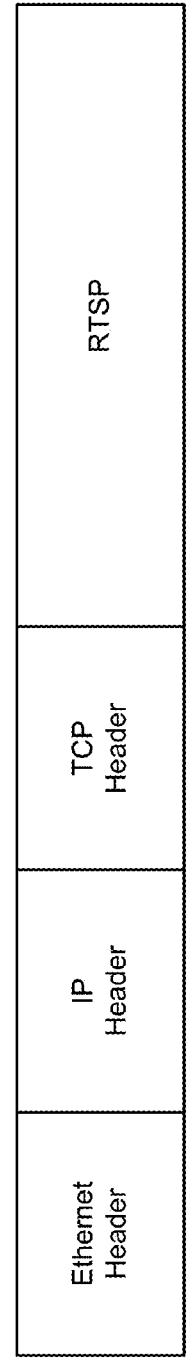
FIG. 6 is a table illustrating an example of a mapping between Application Classes and Specific Applications that can be used in the various techniques disclosed herein.
FIG. 7A is a functional block diagram illustrating an example of a RTSP packet encapsulated within a TCP/IP frame according to an embodiment.

According to an embodiment, the enhanced classification steps disclosed herein can be implemented in the enhanced packet inspection module 410' of the enhanced classification and queuing module 310'. For example, 2-way video conferencing, unidirectional streaming video, online gaming and voice are examples of some different application classes. Specific applications refer to the actual software used to generate the data stream traveling between source and destination. Some examples include: YouTube, Netflix, Skype, and iChat. Each application class can have numerous, specific applications. The table provided in FIG. 6 illustrates some examples where an application class is mapped to specific applications.

According to an embodiment, the enhanced classification and queuing module 310' can inspect the IP source and destination addresses in order to determine the Application Class and Specific Application of the data stream. With the IP source and destination addresses, the enhanced classification and queuing module 310' can perform a reverse domain name system (DNS) lookup or Internet WHOIS query to establish the domain name and/or registered assignees sourcing or receiving the Internet-based traffic. The domain name and/or registered assignee information can then be used to establish both Application Class and Specific Application for the data stream based upon a priori knowledge of the domain or assignee's purpose. The Application Class and Specific Class information, once derived, can be stored for reuse. For example, if more than one user device accesses Netflix, the enhanced classification and queuing module 310' can be configured to cache the information so that the enhanced classification and queuing module 310' would not need to determine the Application Class and Specific Application for subsequent accesses to Netflix by the same user device or another user device on the network.

For example, if traffic with a particular IP address yielded a reverse DNS lookup or WHOIS query which included the name 'Youtube' then this traffic stream could be considered a unidirectional video stream (Application Class) using the Youtube service (Specific Application). According to an embodiment, a comprehensive mapping between domain names or assignees and Application Class and Specific Application can be maintained. In an embodiment, this mapping is periodically updated to ensure that the mapping remains up to date.

According to another embodiment, the enhanced classification and queuing module 310' is configured to inspect the headers, the payload fields, or both of data packets associated with various communications protocols and to map the values contained therein to a particular Application Class or Specific Application. For example, according to an embodiment, the enhanced classification and queuing module 310' is configured to inspect the Host field contained in an HTTP header. The Host field typically contains domain or assignee information which, as described in the embodiment above, is used to map the stream to a particular Application Class or Specific Application. For example an HTTP header field of "v11.1scache4.c.youtube.com" could be inspected by the Classifier and mapped to Application Class=video stream, Specific Application=Youtube.

According to another embodiment, the enhanced classification and queuing module 310' is configured to inspect the 'Content Type' field within a Hyper Text Transport Protocol (HTTP) packet. The content type field contains information regarding the type of payload, based upon the definitions specified in the Multipurpose Internet Mail Extensions (MIME) format as defined by the Internet Engineering Task Force (IETF). For example, the following MIME formats would indicate either a unicast or broadcast video packet stream: video/mp4, video/quicktime, video/x-ms-wm. In an embodiment, the enhanced classification and queuing module 310' is configured to map an HTTP packet to the video stream Application Class if the enhanced classification and queuing module 310' detects any of these MIME types within the HTTP packet.

In another embodiment, the enhanced classification and queuing module 310' is configured to inspect a protocol sent in advance of the data stream. For example, the enhanced classification and queuing module 310' is configured to identify the Application Class or Specific Type based on the protocol used to set up or establish a data stream instead of identifying this information using the protocol used to transport the data stream. According to an embodiment, the protocol sent in advance of the data stream is used to identify information on Application Class, Specific Application and characteristics that allow the transport data stream to be identified once initiated.

For example, in an embodiment, the enhanced classification and queuing module 310' is configured to inspect Real Time Streaming Protocol (RTSP) packets which can be used to establish multimedia streaming sessions. RTSP packets are encapsulated within TCP/IP frames and carried across an IP network, as shown for an Ethernet based system in FIG. 7A.

RTSP (H. Schulzrinne, et al., IETF RFC 2326, Real Time Streaming Protocol (RTSP)) establishes and controls the multimedia streaming sessions with client and server exchanging the messages. A RTSP message sent from client to server is a request message. The first line of a request message is a request line. The request line is formed with the following 3 elements: (1) Method; (2) Request-URI; and (3) RTSP-Version.

RTSP defines methods including OPTIONS, DESCRIBE, ANNOUNCE, SETUP, PLAY, PAUSE, TEARDOWN, GET_PARAMETER, SET_PARAMETER, REDIRECT, and RECORD. Below is an example of a message exchange between a client ("C") and a server ("S") using method DESCRIBE. The response message from the server has a message body which is separated from the response message header with one empty line.

```
C->S:    DESCRIBE rtsp://s.companydomain.com:554/dir/f.3gp
         RTSP/1.0
         CSeq: 312
         Accept: application/sdp
S->C:    RTSP/1.0 200 OK
         CSeq: 312
         Date: 23 Jan 1997 15:35:06 GMT
         Content-Type: application/sdp
         Content-Length: 376
         v=0
         o=- 2890844526 2890842807 IN IP4 126.16.64.4
         s=SDP Seminar
         c=IN IP4 224.2.17.12/127
         t=2873397496 2873404696
         m=audio 49170 RTP/AVP 0
         m=video 51372 RTP/AVP 31
```

Request-URI in an RTSP message always contains the absolute URI as defined in RFC 2396 (T. Berners-Lee, et al., IETF RFC 2396, "Uniform Resource Identifiers (URI): Generic Syntax"). An absolute URI in an RTSP message contains both the network path and the path of the resource on the server. The following is the absolute URI in the message listed above.

rtsp://s.companydomain.com:554/dir/f.3gp

RTSP-Version indicates which version of the RTSP specification is used in an RTSP message.

In one embodiment, the enhanced classification and queuing module 310' is configured to inspect the absolute URI in the RTSP request message and extract the network path. The network path typically contains domain or assignee information which, as described in the embodiment above, is used to map the stream to a particular Application Class or Specific Application. For example, an RTSP absolute URI "rtsp://v4.cache8.c.youtube.com/dir_path/video.3gp" could be inspected by the Classifier and mapped to Application Class=video stream, Specific Application=Youtube. In one embodiment, the enhanced classification and queuing module 310' inspects packets sent from a client to a server to classify related packets sent from the server to the client. For example, information from an RTSP request message sent from the client may be used in classifying responses from the server.

The RTSP protocol may specify the range of playback time for a video session by using the Range parameter signaled using the PLAY function. The request may include a bounded (i.e.—start, stop) range of time or an open-end range of time (i.e. start time only). Time ranges may be indicated using either the normal play time (npt), smpte or clock parameters. Npt time parameters may be expressed in either hours:minutes:seconds.fraction format or in absolute units per ISO 8601 format timestamps. Smpte time values are expressed in hours:minutes:seconds.fraction format. Clock time values are expressed in absolute units per ISO 8601 formatted timestamps. Examples of Range parameter usage are as follows:

```
Range: npt=1:02:15.3-
Range: npt=1:02:15.3 - 1:07:15.3
Range: smpte=10:07:00-10:07:33:05.01
Range: clock=19961108T142300Z-19961108T143520Z
```

In one embodiment, the enhanced classification and queuing module 310' is configured to inspect the RTSP messages and extract the Range information from a video stream using the npt, smpte or clock fields. One skilled in the art would understand that the npt, smpte and clock parameters within an RTSP packet may use alternate syntaxes in order to communicate the information described above.

The RTSP protocol includes a DESCRIBE function that is used to communicate the details of a multimedia session between Server and Client. This DESCRIBE request is based upon the Session Description Protocol (SDP is defined in RFC 2327 and RFC 4566 which supersedes RFC 2327) which specifies the content and format of the requested information. With SDP, the m-field defines the media type, network port, protocol and format. For example, consider the following SDP media descriptions:

```
m=audio 49170 RTP/AVP 0
m=video 51372 RTP/AVP 31
```

In the first example, an audio stream is described using the Real-Time Protocol (RTP) for data transport on Port 49170 and based on the format described in the RTP Audio Video Profile (AVP) number 0. In the second example, a video stream is described using RTP for data transport on Port 51372 based on RTP Audio Video Profile (AVP) number 31.

In both RTSP examples, the m-fields are sufficient to classify a data stream to a particular Application Class. Since the m-fields call out communication protocol (RTP) and IP port number, the ensuing data stream(s) can be identified and mapped to the classification information just derived. However, classification to a Specific Application is not possible with this information alone.

The SDP message returned from the server to the client may include additional fields that can be used to provide additional information on the Application Class or Specific Application.

An SDP message contains the payload type of video and audio stream transported in RTP. Some RTP video payload types are defined in RFC 3551 (H. Schulzrinne, et al., IETF RFC 3551, "RTP Profile for Audio and Video Conferences with Minimal Control"). For example, payload type of an MPEG-1 or MPEG-2 elementary video stream is 32, and payload type of an H.263 video stream is 34. However, payload type of some video codecs, such as H.264, is dynamically assigned, and an SDP message includes parameters of the video codec. In one embodiment, the video codec information may be used in classifying video data streams, and treating video streams differently based on video codec characteristics.

An SDP message may also contain attribute "a=framerate: <frame rate>", which is defined in RFC 4566, that indicates the frame rate of the video. An SDP message may also include attribute "a=framesize:<payload type number> <width> <height>", which is defined in 3GPP PSS (3GPP TS 26.234, "Transparent End-to-End Packet-switched Streaming Service, Protocols and Codecs"), may be included in SDP message to indicate the frame size of the video. For historical reasons, some applications may use non-standard attributes such as "a=x-framerate: <frame rate>" or "a=x-dimensions: <width> <height>" to pass similar information as that in "a=framerate:<frame rate>" and "a=framesize:<payload type number> <width> <height>". In one embodiment, the enhanced classification and queuing module 310' is configured to inspect the SDP message and extract either the frame rate or the frame size or both of the video if the corresponding fields are present, and use the frame rate or the frame size or both in providing additional information in mapping the stream to a particular Application Class or Specific Applications.

In one embodiment, the enhanced classification and queuing module 310' inspects network packets directly to detect whether these packets flowing between two endpoints contain video data carried using RTP protocol (H. Schulzrinne, et al., IETF RFC 3550, "RTP: A Transport Protocol for Real-Time Applications"), and the enhanced classification and queuing module 310' performs this without inspecting the SDP message or any other message that contains the information describing the RTP stream. This may happen, for example, when either the SDP message or any other message containing similar information does not pass through the enhanced classification and queuing module 310', or some implementation of the enhanced classification and queuing module 310' chooses not to inspect such message. An RTP stream is a stream of packets flowing between two endpoints and carrying data using RTP protocol, while an endpoint is defined by a (IP address, port number) pair.

Figure 7B:
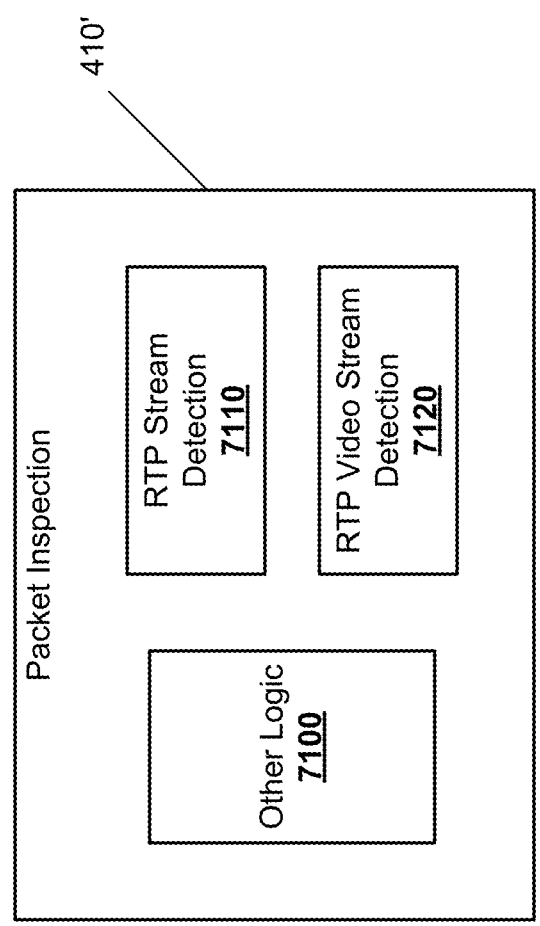
FIG. 7B is a functional block diagram of a packet inspection module according to an embodiment.

FIG. 7B is a functional block diagram of an embodiment of the Enhanced Packet Inspection module 410'. In this embodiment, the Enhanced Packet Inspection module 410' includes an RTP Stream Detection module 7110 and a Video Stream Detection module 7120 for detecting whether either UDP or TCP packets contain video data transported using RTP protocol. The Enhanced Packet Inspection module 410' may also implement other functions which are generally represented by an Other Logic module 7100. In one embodiment, the Enhanced Packet Inspection module 410' receives input traffic flowing in two directions and classifies the packets flowing one direction using information from the packets flowing in the other direction. The Enhanced Packet Inspection module 410' may receive information about the traffic flowing in the other direction from another module rather receiving the traffic itself.

Figure 7C:
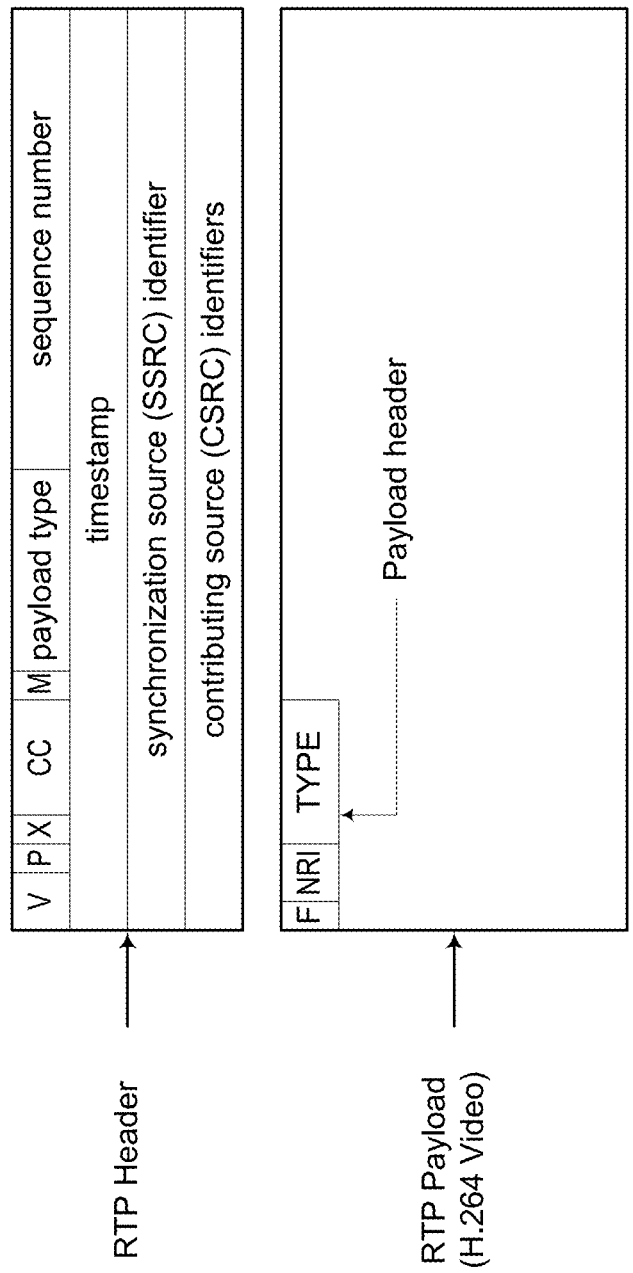
FIG. 7C is a diagram illustrating an example of an RTP packet, including RTP header and RTP payload which contains H.264 video data according to an embodiment.

The RTP Stream Detection module 7110 parses the first several bytes of UDP or TCP payload according to the format of an RTP packet header and checks the values of the RTP header fields to determine whether the stream flowing between two endpoints is an RTP stream. FIG. 7C is a diagram illustrating an example structure of an RTP packet, which includes an RTP header and an RTP payload. In FIG. 7C, the RTP payload contains H.264 video data as an example. The RTP header format does not depend on the media type carried in RTP payload, while the RTP payload format is media type specific. If the payload of a UDP or TCP packet contains an RTP packet, the values of several fields in RTP header will have a special pattern. Some of these special patterns are listed below as examples. Refer to FIG. 7C for the short names in parentheses. The RTP Stream Detection module 7110 may use one of these patterns, a combination of these patterns, or other patterns not listed below in determining whether a stream is an RTP stream.

Field "RTP version" ("V") is always 2.

Figure 7D:
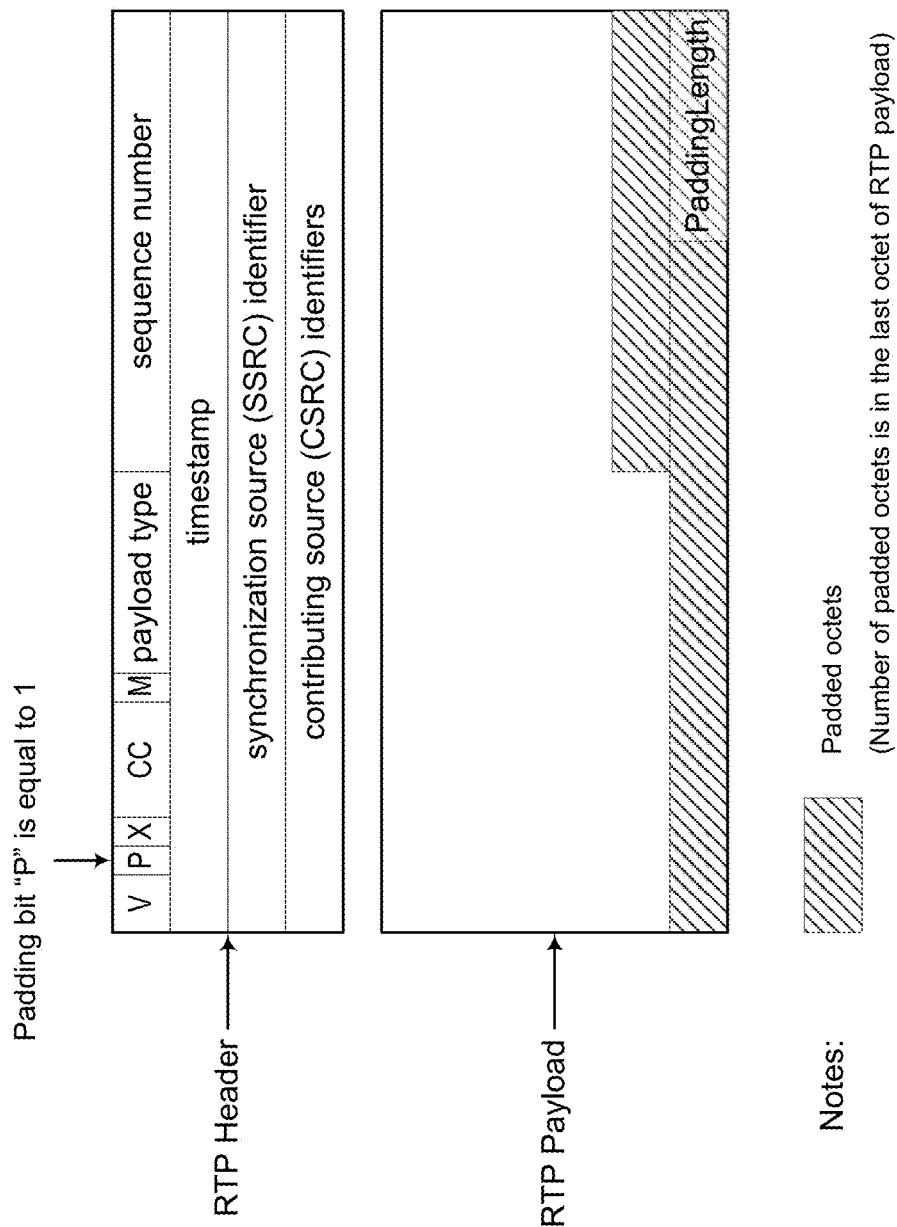
FIG. 7D is a diagram illustrating an example of an RTP packet with padded octets according to an embodiment.

If field "padding bit" ("P") is set to 1, the last octet of the packet is the padding length, which is number of octets padded at the end of the packet. FIG. 7D illustrates such an RTP packet with padded octets at the end of the packet. The padding length must not exceed the total length of RTP payload.

Field "payload type" shall stay constant.

Field "sequence number" should increase by 1 most of time between 2 consecutive packets. Sequence number has a gap when the packets are reordered, or a packet is dropped, or the sequence number rolls over. All of these cases should happen relatively infrequently in normal operation.

Field "timestamp" should have special pattern depending on media type, as detailed below with reference to the Video Stream Detection module 7120.

If a stream is detected to be an RTP stream, the Video Stream Detection module 7120 will perform further inspection on the RTP packet header fields and the RTP payload to detect whether the RTP stream carries video and which video codec generates the video stream.

Payload type of some RTP payloads related to video is defined in RFC 3551. However, for a video codec with dynamically assigned payload type, the codec parameters are included in an SDP message. However, that SDP message may not be available to the Video Stream Detection Module 7120.

If the Video Stream Detection module 7120 detects that payload type is dynamically assigned, it collects statistics regarding the stream. For example, statistics of values of the RTP header field "timestamp", RTP packet size, and RTP packet data rate may be collected. The Video Stream Detection module 7120 may then use one of the collected statistics or a combination of the statistics to determine whether the RTP stream carries video data.

A video stream usually has some well-defined frame rate, such as 24 FPS (frame per second), 25 FPS, 29.97 FPS, 30 FPS, or 60 FPS, etc. In one embodiment, the Video Stream Detection module 7120 detects whether an RTP stream carries video data at least partially based on whether values of the RTP packet timestamp change in integral multiples of a common frame temporal distance (which is the inverse of a common frame rate).

A video stream usually has higher average data rate and larger fluctuation in the instantaneous data rate compared with an audio stream. In another embodiment, the Video Stream Detection module 7120 detects whether an RTP stream carries video data at least partially based on the magnitude of the average RTP data rate and the fluctuation in the instantaneous RTP data rate.

The RTP payload format is media specific. For example, H.264 payload in an RTP packet always starts with a NAL unit header whose structure is defined in RFC 6814 (Y. K. Wang, et al., IETF RFC 6184, "RTP Payload Format for H.264 Video"). In one embodiment, the Video Stream Detection module 7120 detects which video codec generates the video data carried in an RTP stream at least partially based on the pattern of the first several bytes the RTP payload.

Enhanced Queuing

According to an embodiment, the enhanced classification and queuing module 310' can also be configured to implement enhanced queuing techniques. As described above, once enhanced classification has been completed, the enhanced classification and queuing module 310' can assign to an enhanced set of queues based on the additional information derived by the enhanced classification techniques described above. For example, in an embodiment, the packets can be assigned to a set of queues by: application class, specific application, individual data stream, or some combination thereof.

In one embodiment, the enhanced classification and queuing module 310' is configured to use a scheduling group that includes unique queues for each application class. For example, an LTE eNB may assign all QCI=6 packets to a single scheduling group. But with enhanced queuing, packets within QCI=6 which have been classified as Video Chat may be assigned to one queue, while packets classified as Voice may be assigned to a different queue, allowing differentiation in scheduling.

In another alternative embodiment, the enhanced classification and queuing module 310' is configured to use a scheduling group that includes unique queues for each specific application. For example, an LTE eNB implementing enhanced queuing may assign QCI=9 packets classified as containing a Youtube streaming video to one scheduling queue, while assigning packets classified as a Netflix streaming video to a different scheduling queue. Even though they are the same Application Class, the packets are assigned different queues in this embodiment because they are different Specific Applications.

In yet another embodiment, the enhanced classification and queuing module 310 is configured such that a scheduling group may consist of unique queues for each data stream. For example an LTE eNB may assign all QCI=9 packets to a single scheduling group. Based on enhanced classification methods described above, each data stream is assigned a unique queue. For example, consider an example embodiment with a scheduling group servicing 5 mobile phone users, each running 2 Specific Applications. In one embodiment, if the applications for each mobile device are mapped to the default radio bearer for the mobile this would result in 5 queues, one for each mobile, carrying heterogeneous data using the original classification and queuing module. However, in one embodiment, 10 queues are created by the enhanced classification and queuing module 310 in support of the 10 data streams. In an alternative example, each of the 5 mobiles has 2 data streams which use the same Specific Application. In this case, the data streams are also classified based on, for instance, port number or session ID into separate queues resulting in 10 queues.

One skilled in the art will recognize that the enhanced categorization and queuing techniques described above can be used to improve the queuing in a wireless or wired network communication system. One skilled in the art will also recognize that the techniques disclosed herein can be combined with other methods for assigning packets to queues to provide improved queuing.

Application Factor

According to an embodiment, the scheduler parameter calculation module 335 is configured to use enhanced policy information when calculating scheduler parameters to address QoE deficiencies of some weight or credit calculation techniques described above. According to an embodiment, the enhanced policy information 350 can include the assignment of a quantitative level of importance and relative priority based upon Application Class and Specific Application. This factor is referred to herein as the Application Factor (AF) and the purpose of the AF is to provide the operator with a means to adjust the relative importance, and ultimately the scheduling parameters, of queues following enhanced classification and enhanced queuing. In another embodiment, AFs are established through the use of internal algorithms or defaults, requiring no operator involvement.

FIG. 8 is a table illustrating sample AF assignments on per Application Class and per Specific Application basis according to an embodiment. In cases where it is not possible to identify the Specific Application carried by a packet or data stream, an AF assignment can be made to an 'unknown' category within the Application Class. To optimize QoE for throughput and latency sensitive applications, video and voice applications have been assigned higher AF values (all but one is 6 or higher) over background data and social network traffic (AF in the range of 0-2).

Within the video chat class, the operator may discover that one video chat service (e.g., iChat) is substantially more burdensome (e.g., requires more capacity, has less latency or jitter tolerance) than another (e.g., Skype video), and can attempt to encourage the use of the more network friendly application by assigning a higher AF value to the Skype video chat than to iChat (8 versus 5).

Similarly, the operator may decide to preserve the QoE of a paid service, such as Netflix, at the expense of what may be considered the less important need to view short, free services, such as YouTube videos by adjusting the AF associated with these services. The operator may desire the ability to enhance certain voice services (e.g. Skype audio, Vonage) who have engaged strategically with the Operator with a high AF (8 and 6, respectively) while assigning all remaining (i.e. non-strategic) voice services a very low AF of 1.

One of ordinary skill in the art would understand that different AF values could be used to create different and varying weight or credit relationships between the application classes and specific applications. One skilled in the art would also understand how additional application classes and specific applications beyond those shown in FIG. 8 could be added.

Additionally, one of ordinary skill in the art would understand that AFs may be assigned differently based upon node type and/or node location. For example, an LTE eNB serving a suburban, residential area may be configured to use one set of AFs while an LTE eNB serving a freeway may be configured use a different set of AFs.

Scheduling Parameters

According to an embodiment, enhanced scheduler parameter calculation module 335 can also be configured to implement enhanced techniques for determining weighting or credit factors. As described above, some weight or credit calculation algorithms can adjust scheduling parameters for individual queues based on various inputs. For example, in the system illustrated in FIG. 3, the scheduler parameter calculation module 335 can be configured to calculate the new scheduler parameters based on a various inputs, including the classification information 330, optional operator policy and SLA information 350, and optional scheduler feedback information 345 (e.g., stream history received from scheduler module 320).

According to an embodiment, an enhanced scheduler parameter calculation module 335 can use additional weight and credit calculation factors to improve QoE performance. For example, in an embodiment, an additional weight factor can be used to generate an enhanced weight (W') as shown below:

$$W'(q) = a*W(q) + b*AF(q)$$

where:
W'=enhanced queue weight
q=the queue index
W=the queue weight derived by conventional weight calculations
a=coefficient mapping W to W'
AF=the Application Factor
b=coefficient mapping AF to W'

For example, in an embodiment, an LTE eNB base station with 5 active streams (designated by a stream index i) within a single queue, best effort scheduling group (e.g. QCI=9 in LTE), is shown in FIG. 9. Due to the deficiencies described in the conventional techniques, there are numerous Application Classes and Specific Applications assigned to a single queue in this scheduling group. In this example, all packets are assigned to the same queue resulting in no differentiation between Application Class and/or Specific Application by the scheduler.

For example, stream #1, a Facebook request, and stream #4, a Skype video chat session are both assigned to the same queue. Because packets from both streams are in the same queue, both streams must share the resources provided by the scheduler in a non-differentiated manner. For example, packets may be serviced in a FIFO method from the single queue thereby creating a "first to arrive" servicing of packets from both streams. This is undesirable during times of network congestion, due to the fact that a video chat session is more sensitive, in terms of user QoE, to packet delay or discard than a Facebook update.

In contrast, if the enhanced weight calculation technique described above (which can be implemented in enhanced scheduler parameter calculation module 335) are applied, each of the five streams (designated by index i in FIG. 9) can be assigned to unique queues (designated by index q in FIG. 9). Each queue may then be assigned unique, enhanced weights as a function of Application Class and Specific Application. For example, the columns W1 and W2 in FIG. 9 demonstrate the results of enhanced queue weight calculations based on the Application Class, Specific Application and AF shown in FIG. 8, assuming each data stream i is assigned to a unique queue, q.

Weights W1 and W2 are calculated for each stream using the equation for W' (described above) with coefficient 'a' set to 1, and coefficient 'b' set to 0.5 and 1, respectively. That is:

$$W1(q)=W(q)+0.5*AF(q)$$

$$W2(q)=W(q)+AF(q)$$

The effect of the calculation can be seen by again comparing data stream #1 with stream #4. For W1, the video chat stream has a weight of 7 which is now larger than the Facebook stream weight of 4. As coefficient 'b' is increased to 1.0 in the calculations of W2, the difference in weight between stream #4 and #1 increases further (11 and 5, respectively).

For cases W1 and W2, the Skype stream will be allocated more resources than the Facebook stream. This increases the likelihood that the Skype session will be favored by the scheduler and can improve session performance and QoE during times of network congestion. While this comes at the expense of the Facebook session, the tradeoff is asymmetrical: packet delay/discard will have a smaller effect (i.e. less noticeable) on the Facebook session as compared to the equivalent packet treatment for a video chat session. Therefore the application-aware scheduling system has provided a more optimal response with respect to end-user QoE.

In an alternative example, each data stream in FIG. 9 is for a different mobile and may already be in separate queues within the scheduling group for QCI 9. In some systems the weight assigned to each queue would not consider Specific Application or Application Class. However, as described herein, in some embodiments, the weights are differentiated.

Similarly, an enhanced per scheduling round credit could be calculated for credit-based scheduling algorithms using the formula $C'(q)=a*C(q)+b*AF(q)$, where C (for credit) replaces the W (for weight) in the enhanced weight calculation formula. This enhanced credit would be added to the queue's accumulated credit (possibly capped) each scheduling round while allocated bandwidth would be debited from the accumulated credit. The AF is used in the same manner for both credit and weight based calculations, although the scale of AF may differ in the credit-based equation relative to the weight-based equation due to the typical difference in scale between weights and data rates when used in scheduling algorithms.

One of ordinary skill in the art would also recognize that the systems and methods described above may be extended to cases for which a queue contains packets from more than one data stream, more than one Specific Application, more than one Application class or combinations thereof for which an aggregate scheduling may be appropriate. For example, an enhanced weight or credit may be assigned to a queue containing three Skype/Video Chat data streams generated by three different mobile phones. Additionally, the systems and methods described above may be applied to all or only a subset of queues in one or more scheduling groups. For example, enhanced parameter calculation and enhanced queuing may be applied to an LTE QCI=9 scheduling group but known parameter calculation may be applied to LTE QCI=1-8 scheduling groups. Furthermore, the mapping of coefficients 'a' and 'b' may be adjusted as a function of scheduling group or alternative grouping of queues. For example, coefficient 'b' may be set to 1 for a scheduling group containing LTE QCI=9 queues but set to 0.5 for LTE QCI=8 queues.

Time-Varying Application Factor

According to an embodiment, the enhanced scheduler parameter calculation module 335 can also be configured to extend the application factor (AF) from a constant to one or more time-varying functions, AF(t). According to some embodiments, the AF is adjusted based upon a preset schedule. An operator may desire a particular treatment of applications at one time during the day and a differing treatment during other times.

For example, in one embodiment, the enhanced scheduler parameter calculation module 335 is configured to use "rush hour" AF values during typical commute times where voice calls are the predominant application running on a mobile network, especially for those cells and sectors serving transportation routes. For such times, (e.g., Monday through Friday, 7 am to 9 am and 4 pm to 7 pm) all voice applications are assigned an AF=10 improving the level of service above all other applications (referencing FIG. 8). Outside of those time periods, the enhanced scheduler parameter calculation module 335 is configured to revert to the regular AF values.

In another example, the enhanced scheduler parameter calculation module 335 is configured to use larger AF values with over-the-top (OTT) video services during periods where such services are most likely to be used. For example, the enhanced scheduler parameter calculation module 335 is configured to use larger AF values during evenings on weekends, especially for networks that service residential areas. Referring once again to FIG. 8, the peak settings for OTT video could include, for example, setting Video Stream applications (e.g. unknown video stream and Netflix) to an AF=10 between 7-11 pm on Friday and Saturday.

The overall quantity of data for a particular application class or specific application can be used in the calculation and assignment of AFs. For instance, if all data were from the same specific application, there may be no need to adjust AFs since all streams would warrant the equivalent user experience (however, even then characteristics, such as frames per second or data rate per stream, could still be used to modify AFs as described below). If there was very little data requiring a high quality of user experience, for instance only one active Netflix session with all other data being email, the AF of the Netflix stream may be increased much more than would normally be the case to ensure the best quality of experience (for example, fewest lost packets) possible, knowing all or most other data is delay tolerant and may have built-in retransmission mechanisms. In an alternative embodiment, the AF is calculated as a function of the percentage of total available bandwidth required by homogenous or similar data streams. For instance, Netflix streams could start with a high AF, but as a higher percentage of data usage is consumed by Netflix, the AF for all Netflix streams may decrease, or the AF for new Netflix streams may decrease leaving existing Netflix streams' AFs unchanged.

One of ordinary skill in the art would recognize that periodic, schedule based AF adjustments can be based on any recurring period including, but not limited to, time of day, day of week, tide, season and holidays. Furthermore, in an embodiment the enhanced scheduler parameter calculation module 335 is configured to use non-recurring scheduling to adjust the AF in response to local sporting, business and community activities or other one-time scheduled events. According to some embodiments, the AF values can be manually configured by a network operator for non-recurring scheduling. According to other embodiments, the enhanced scheduler parameter calculation module 335 is configured to access event information stored on the network (or in some embodiments pushed to the network node on which the enhanced scheduler parameter calculation module 335 is implemented) and the enhanced scheduler parameter calculation module 335 can automatically update the AF values according to the type of event. According to an embodiment, the enhanced scheduler parameter calculation module 335 can also be configured to update the AF values in real-time to accommodate unforeseen events including changing weather patterns, natural or other disasters or law enforcement/military activity.

Application Factor with Dependency on Application Characteristics

According to an embodiment, the enhanced scheduler parameter calculation module 335 can be configured to extend the application factor (AF) from a function of application class and specific application to also depend on application characteristics. According to some embodiments, the AF is further adjusted based upon video frame size, video frame rate, video stream data rate, duration of the video stream, amount of data transferred with respect to the total amount of video stream data, video codec type, or a combination of any of these video application characteristics.

In an embodiment, the optimization criterion is to increase the number of satisfied users. Based on this criterion, the AF of a video data stream is adjusted by an amount inversely proportional to the data rate of the video stream. A lower AF may result in more packets being dropped during periods of congestion than would be dropped using a higher AF. For the similar amount of quality degradation, lowering the AF of a video stream of higher data rate may free up more network bandwidth than lowering the AF of a video stream of lower data rate. During the period of congestion, it is preferred to lower the AF of a video stream of higher data rate first, so the number of satisfied users can be maximized.

In an embodiment, the optimization criterion is to minimize perceivable video artifacts caused by imperfect packet transfer. Under this criterion, the AF of a video stream is adjusted by an amount proportional to the frame size, but inversely proportional to frame rate. For instance, a lower AF may result in more frames being dropped during periods of congestion than would be dropped when using a higher AF. An individual frame of a video stream operating at 60 frames per second is a smaller percentage of the data over a given time period than an individual frame of a video stream operating at 30 frames per second. Since the loss of a frame in a video stream operating at 60 frames per second would be less noticeable than the loss of a frame in a video stream operating at 30 frames per second, the stream operating at 30 frames per second may be given a higher AF than the stream operating at 60 frames per second.

In an embodiment, the AF of a data stream may be adjusted dynamically by an amount proportional to the percentage of data remaining to be transferred. For example, a lower AF may be assigned to a data stream if the data transfer is just started. For another example, a higher AF may be assigned to a data stream if the transfer of entire data stream is about to complete.

In an embodiment, the AF of a video data stream is adjusted by a value dependent on the video codec type detected. A lower AF may be assigned to a video codec which is more robust to packet loss. For example, an SVC (H.264 Scalable Video Coding extension) video stream may be assigned a lower AF than a non-SVC H.264 video stream.

In an embodiment, the AF of a video data stream is adjusted based upon the duration of the video data stream, the amount of time remaining in the video data stream, or a combination thereof. For example, an operator may decide to assign a higher AF to a full-length Netflix movie as compared to a short 10 second Youtube clip, since the customer may have a higher expectation of quality for a feature length film as compared to a brief video clip. In another example, the operator may decide to dynamically assign a higher AF to a video data stream that is nearing completion as compared to one that is just starting in order to leave the customer who has finished viewing a video data stream with the best possible impression (see Recency Effect described below).

Information describing the duration of a video data stream may be obtained using the enhanced classification methods described above, including the Range information indicated during an RTSP message exchange. Information on the amount of time remaining in the video data stream may be calculated, for example, by subtracting the current video playback time from the stop time indicated in the Range information. Current video playback time may also be obtained by inspection of individual video frames or by maintaining a free-running clock which is reset at the beginning of playback. One skilled in the art would understand there may be alternate methods to obtain current video playback time.

In an embodiment, the AF of a video data stream is adjusted based upon the specific client device or device class used to display the video data stream. Device classes may include cell phones, smartphones, tablets, laptops, PCs, televisions or other devices used to display a video data stream. Device classes may be further broken into subclasses to include specific capabilities. For example, a smartphone with WiFi capability may be treated differently than a smartphone without WiFi capability.

The specific device may refer to the manufacturer, model number, configuration or some combination thereof. An Apple Iphone4 (smartphone) or Motorola Xoom (tablet) are examples of a specific device.

The client device class, subclass, or specific device may be derived using various methods. In an embodiment, the device class may be derived using video frame size as described above. For example, the HTC Thunderbolt smartphone uses a screen resolution of 800 pixels×480 pixels. The enhanced packet inspection module 410' can detect or estimate this value using methods described above and determine the device class based upon a priori knowledge regarding the range of screen resolutions used by each device class or specific device.

In an embodiment, information regarding the device class, subclass or specific device is signaled between the client device and an entity in the network. For example, in a wireless network 100, a client device 150 may send information describing the vendor and model to the core network 102 when the client device initially joins the network. This information may be learned, for example, by the enhanced packet inspection module 410' of a base station 110 for use at a later time.

Once learned, the device class, subclass, or specific device may be used to adjust the AF based upon operator settings. For example, in FIG. 8, the AF for Netflix (a Specific Application) may be raised from 7 to 9 if the device class is determined to be a large screen television where the expectation for high quality playback is deemed critical.

In an embodiment, AF may be further modified by one or more service levels communicated via operator policy/SLA 350. For example, an operator may sell a mobile Netflix package in which customers pay additional fees in support of improved video experiences (e.g. quality, quantity, access) on their mobile phones. For customers participating in this program, the operator may assign an increased AF for the video stream Application Class shown in FIG. 8. For example, Netflix AF may be increased from 7 to 9, Youtube AF may be increased from 4 to 7 and the unknown video stream category AF may be increased from 5 to 7. Additionally, SLAs may be used to differentiate customers, governing whether a particular customer's data is eligible to receive preferential treatment via AF modification. One skilled in the art would recognize that adjusting AF as a function of service levels may or may not be used in conjunction with device class, subclass or specific device.

In addition to selling retail services directly to the end user, a network operator may additionally or alternatively sell network capacity on a wholesale basis to a second operator (termed a virtual network operator or VNO) who may then sell retail services to the end user. For example, mobile network operator X may build and maintain a wireless network and decide to sell some portion of the network capacity to operator Y. Operator Y may then create a retail service offering to the general public which, possibly unbeknownst to the end user, uses operator X capacity to provide services.

In an embodiment, AF may be further modified by the existence of a VNO who may be using capacity on a network. For example, an operator X may have two VNO customers: Y and Z, each with differing service agreements. If operator X has agreed to provide VNO Y with better service than VNO Z, then data streams associated with VNO Y customers may be assigned a higher AF than streams associated with VNO Z customers, for a given Device Class, Application Class and Specific Application. In another example, operator X may sell retail services directly to end users and contract to sell services to VNO Y. In this case, the operator X may choose to provide its customers higher service levels by assigning a larger AF to streams associated with its customers as compared to those associated with VNO Y customers. Enhanced classification methods may be used to identify traffic associated with different VNO customers, including, for example, inspection of IP gateway addresses, VLAN IDs, MPLS tags or some combination thereof. One skilled in the art would recognize that other methods may exist to segregate traffic between VNO customers and the operator.

Duration Neglect and Recency Effects

A further method to enhance the weight function extends the mapping coefficient, b, to a time varying function, assigned on a per queue basis. That is, b is a function of both time (t) and queue (q), b(q,t). In one embodiment, b(q,t) is adjusted in real-time, in response to, or in advance of, scheduler decisions for streams carrying video data streams (streaming or two-way) each on unique queues. This embodiment can further reduce peak load with minimal QoE loss by taking advantage of both the recency effect (RE) and duration neglect (DN) concepts as described by Aldridge et al. and Hands et al. See Aldridge, R.; Davidoff, J.; Ghanbari, M.; Hands, D.; Pearson, D., "Recency effect in the subjective assessment of digitally-coded television pictures," Image Processing and its Applications, 1995., Fifth International Conference on, vol., no., pp. 336-339, 4-6 Jul. 1995, and Hands, D. S.; Avons, S. E.: Recency and duration neglect in subjective assessment of television picture quality. Journal of Applied Cognitive Psychology, vol. 15, no. 6, pp. 639-657, 2001, which are both incorporated by reference as if set forth in full herein.

The concept of DN is that the duration of an impairment viewed during video playback is less important than its severity. Thus for video being transported across a multiuser, capacity constrained network, it may be preferred (from a QoE perspective) for a scheduler which has already dropped one or more video packets from a video stream to continue to drop packets from that stream, rather than choose to drop packets from an alternate video stream, so long as the packet loss rate does not exceed a preset threshold. For example, based on the DN concept, discarding 5% of the packets of a single video stream over 10 seconds provides improved network QoE as compared to discarding 5% of the packets for 2 seconds, for each of 5 different video streams.

The concept of RE is that viewers of a video playback tend to forget video impairments after a certain amount of time and therefore judge video quality based on the most recent period of viewing. For example, a viewer may subjectively judge a video playback to be "poor" if the video had frozen (i.e. stopped playback) for a period of 2 seconds within the last 15 seconds of a video clip and judge playback to be "average" if the same 2 second impairment occurred 1 minute from the end of the video clip.

Figure 10:
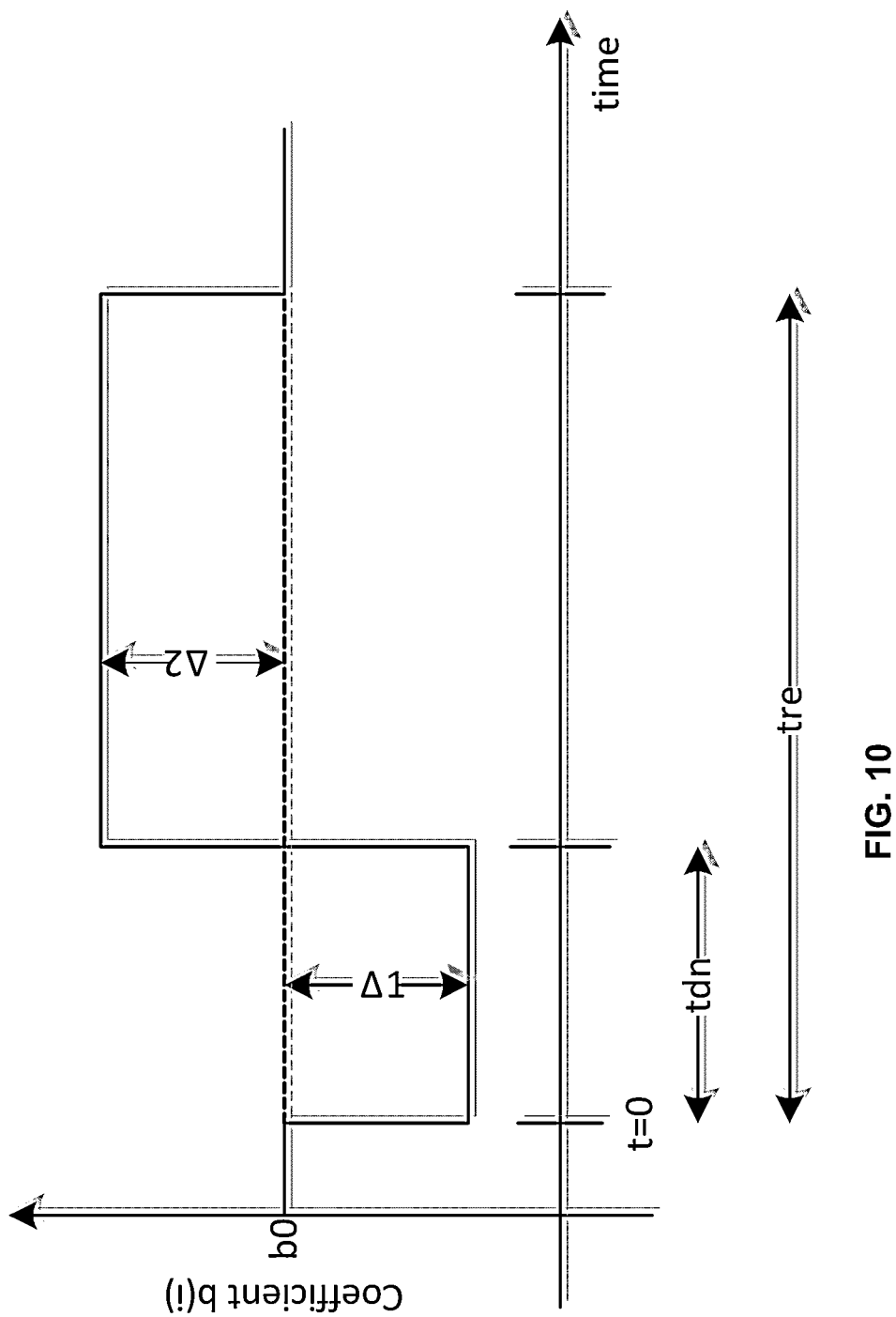
FIG. 10 is a timing diagram that illustrates management of coefficients that can be used in the enhanced weight factor or credit calculations disclosed herein.
Figure 11:
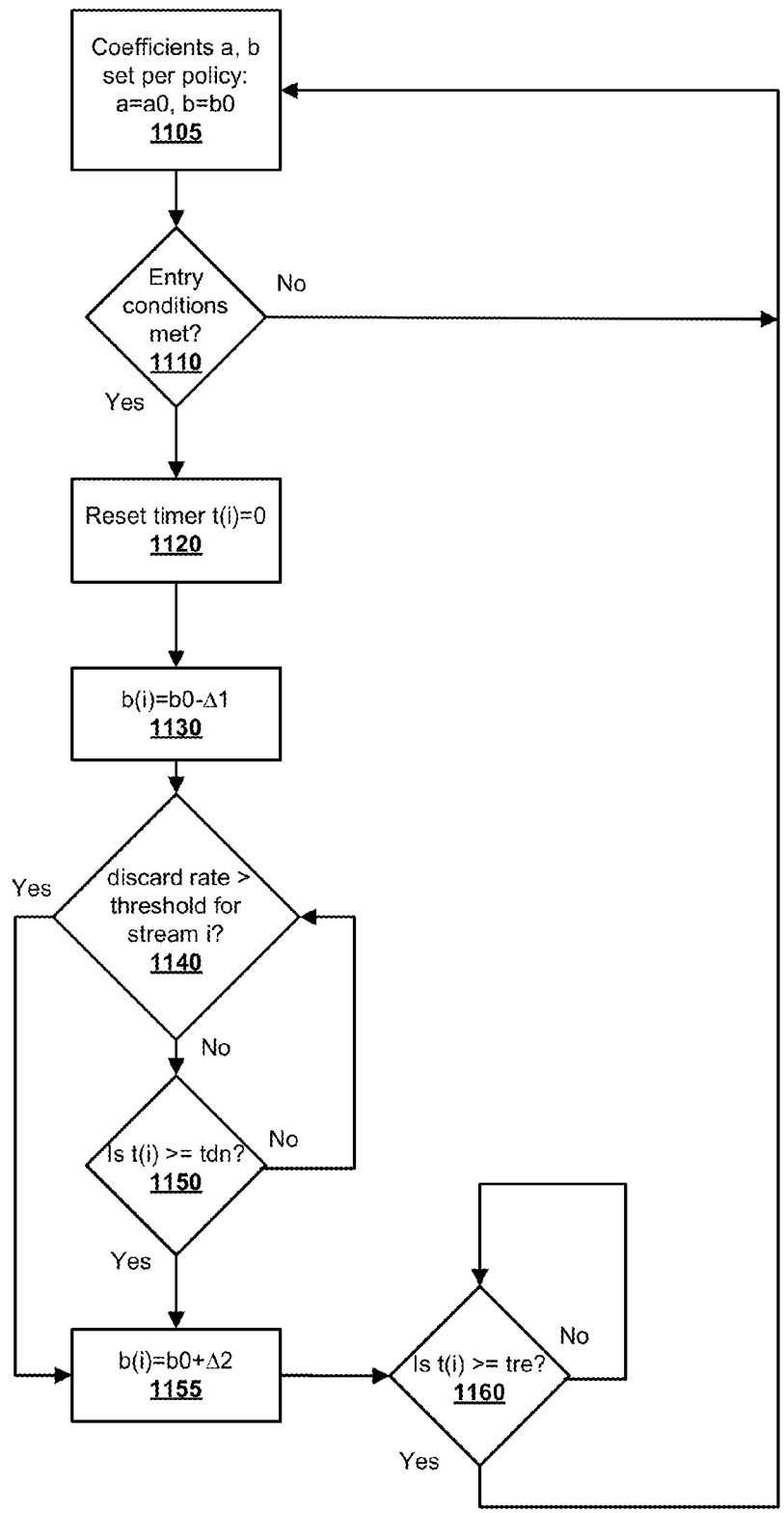
FIG. 11 is a flow chart of a method for calculating coefficients according to an embodiment.

To this end, the coefficient 'b' of the enhanced weight equation (W'(q)=a*W(q)+b*AF(q)) or the enhanced credit equation (C'(q)=a*C(q)+b*AF(q)) is managed, on a per queue (and in this case a per data stream) basis, using the timing diagram shown in FIG. 10 and the method illustrated in FIG. 11. Per the concept of DN, a video stream that has undergone packet loss can "tolerate" additional, modest packet loss (or some other evaluation metric) without a substantial degradation of user QoE. This extension of degradation relieves some, potentially all, of the network congestion and thus benefits the remaining user streams which can be serviced without degradation. Following a period of degradation, a video stream is serviced with increased performance for a period of time, per the concept of RE.

As shown in FIG. 10, during the period of intentional degradation, the value of b(i) is adjusted from its nominal value of b0 downward by an amount Δ1, for a period of tdn. This is followed by a period of enhancement in which b(i) is increased by Δ2 above b0 (Δ2 could be 0). This enhancement period lasts for the remainder of the period tre after which the coefficient b(i) returns to its normal value=b0.

FIG. 11 illustrates a method for assigning weights or credits to queues in a scheduling system according to an embodiment. In an embodiment, the method illustrated in FIG. 11 is implemented in scheduler parameter calculation module 335.

The method illustrated in FIG. 11, begins with coefficients a and b of the enhanced weight or credit equation being set per policy to a0 and b0, respectively (step 1105). One or more algorithm entry conditions are then evaluated (step 1110). In one embodiment, the algorithm entry condition is a signal from the scheduler that video stream i must initiate the algorithm due to current or predicted levels of congestion in the network. In an alternative embodiment, the entry condition is based on detection of one or more dropped or delayed packets by the scheduler from video stream i. One of ordinary skill in the art will recognize that additional entry conditions can be created using various combinations of scheduler and classifier information. One of ordinary skill in the art will further recognize that entry conditions can be based upon meeting one or more criteria be based on various forms of information including triggers, alarms, thresholds, or other methods.

Once the entry condition or conditions have been met, a two-stage timing algorithm is initiated. A stream time is reset to zero (step 1120) and the value of b(i) is reduced by an amount Δ1 (step 1130).

A determination is then made whether the current frame discard rate exceeds a threshold for stream i (step 1140). For example, in an embodiment, the threshold is set to 5% over a 1 second period. In other embodiments, a different threshold can be set up for the stream based on the desired performance characteristics for that stream.

If the frame discard rate for the stream exceeds the threshold, the intentional degradation phase is terminated and the method continues with step 1155. Otherwise, if the frame discard rate does not exceed the threshold, a determination is made whether the timer has reached tdn. If the timer has reached or passed tdn, the intentional degradation phase is terminated and method continues with step 1155. Otherwise, if tdn has not been reached, the method returns to step 1140 where the a determination is again made whether the current frame discard rate exceeds a threshold for stream i.

The coefficient b(i) is set to a value of b0+Δ2 (step 1155) before the timer is once again checked. A determination is then made whether the timer has reached tre (step 1160). If tre has not yet been reached, the method returns to step 1160. Otherwise, if the timer has reached tre, the method returns to step 1105.

According to an alternative embodiment, iteration through step 1160 can gradually adjust Δ2 towards zero over time period tre. According to another alternative embodiment, alternative (or additional) metrics such as packet latency, jitter, a predicted video quality score (such as VMOS) or some combination thereof is evaluated in step 1140. In a further embodiment, step 1140 is adjusted so that if the evaluation metric exceeds the threshold, the value Δ1 is reduced by an amount Δ3 with control then passing to step 1150 (rather than to step 1155).

In some systems, data identified as coming from two applications with different scheduling needs may be difficult to separate into separate queues for application of differing AFs, for example, for queues 491 and 491' in FIG. 4B. Instead the data for both applications would remain in the same queue 491 as shown in FIG. 4A. This may happen, for instance, in an LTE system where the data from two different applications may be mapped by the core network onto the same data bearer. From the point of view of both the core network equipment (for example, Mobility Management Entity (MME), Serving Gateway, and Packet Gateway) and the UE, the data bearer is indivisible and has a bearer ID which may be included in the header of each packet as it is transmitted over the air. Additionally, if the bearer is operating in acknowledged mode (AM), the packets belonging to a bearer are tagged with sequence numbers. Separating the data from the two applications into different scheduling queues for application of different AFs may cause them to arrive at the UE out of order. This can cause the UE to lose synchronization with the stream. Delayed packets may be assumed lost, generating unnecessary retransmission requests. Sequence numbers may also be used, in part, for ciphering and deciphering packets. Out of order packets can cause loss of synchronization in the ciphering/deciphering process resulting in failure of that process. It can also affect the efficiency of header compression algorithms if sequence numbers are out of order, decreasing the benefit of one of the compression mechanisms.

These problems can be overcome in various ways. In one embodiment, the data is split into separate queues 491 and 491' which can be given different AFs. In this case, it is preferential to apply sequence numbers, ciphering, and header compression on the egress of the queues so that the data appears to have been pulled from a single queue with the scheduling order appearing to be the receipt order. This, however, is computationally complex and the order of processing, especially ciphering, may cause severe demand for computational resources. In another embodiment, rather than splitting queue 491 into queues 491 and 491', the AF for queue 491 can be determined based on the combination of applications classes or specific applications currently carried on the data bearer rather than an individual application class or specific application. For instance, if video data is detected on the bearer it may have an AF that is modified to reflect the QoE requirements of video even though the bearer may also have a background application that is periodically checking for email updates. When the use of video subsides, the AF may be returned to a value more appropriate for best effort data traffic. This is computationally less complex and achieves a similar result in cases such as streaming video when an application with demanding requirements is active most other data, if any, on the same bearer will be low in bandwidth relative to the demanding application. That is to say, the user will be concentrating on the video, voice, gaming, video conferencing, or other high bandwidth application while it is in use. To additionally guard against situations where the application with generally more demanding performance is not the bulk of the data on a bearer, for instance playing a low bit rate YouTube video while email is downloading a very large attachment, the application factor can be a function of the percentage of traffic on the bearer from an application class or specific application rather than merely the presence of the application class or specific application.

The enhanced weight equation, $W'(q)=a*W(q)+b*AF(q)$, and the enhanced credit equation, $C'(q)=a*C(q)+b*AF(q)$, may be further modified to also include the effects of additional factors such as the current state of the queues, the current state of the communication link, and additional characteristics of the data streams. This may result in equations of the form:

$$W'''(q)=a*W(q)+b*AF(q)+c1*F1(q)+c2*F2(q)+\ldots,$$
and $$C'''(q)=a*C(q)+b*AF(q)+c1*F1(q)+c2*F2(q)+\ldots,$$

where W''' is the modified weight and C''' is the modified credit, F1 and F2 are additional weight or credit factors, and c1 and c2 are coefficients for mapping the additional factors to the modified weight or the modified credit.

One skilled in the art would understand that adjusting the weights or credits using multiplicative additional factors rather than additive additional factors, or a combination of additive and multiplicative additional factors (e.g. W'''(q)= a*W(q)+b*AF(q)*c1*F1(q)+c2*F2(q)+ . . . ) is possible, allowing scaling of weight or credit changes.

In an embodiment, a queue's weights or credits may be adjusted based upon queue depth. If a queue serving, for instance, a video or VoIP stream reaches x % of its capacity, weights or credits may be dynamically increased by an additional factor until the queue falls below x % full, at which point the increase is no longer applied. The additional factor may be in itself application specific, for instance with a different additional factor being applied for video than for voice, or may be dependent on the data rate of the service. In some embodiments, hysteresis is provided by including a delta between the buffer occupancy levels at which weight and credit increases begin and end. Additionally, when the queue is x' % full, where x'>x, weights or credits may be further increased. In a further embodiment, a queue's weights or credits may be adjusted in part or in whole by a factor proportional to queue depth. These techniques allow additional factors to be applied to an individual stream in addition to or instead of an application factor (AF).

In another embodiment, a queue's weights or credits may be adjusted based upon packet discard rate. If a queue serving, for instance, a video or VoIP stream exceeds capacity and packets are discarded, the discard rate is monitored. If the discard rate exceeds a threshold, weights or credits may be dynamically increased by an additional factor until the discard ceases or falls below the prescribed acceptable level, at which point the increase is no longer applied. The additional factor may be in itself application specific, for instance with a different additional factor being applied for video than for voice, or may be dependent on the data rate of the service. In some embodiments, hysteresis is provided by including a delta between the discard rates at which weight and credit increases begin and end. Additionally, when the discard rate exceeds a higher threshold, weights or credits may be further increased. In a further embodiment, a queue's weights or credits may be adjusted in part or in whole by a factor proportional to packet discard rate.

In an embodiment, a queue's weights or credits may be adjusted based upon packet latency. If the average (or maximum over some time period) packet latency for a queue serving, for instance, a video or VoIP stream exceeds a threshold, weights or credits may be dynamically increased by an additional factor until the packet latency falls below the prescribed acceptable level, at which point the increase is no longer applied. The additional factor may be in itself application specific, for instance with a different additional factor being applied for video than for voice, or may be dependent on the data rate of the service. In some embodiments, hysteresis is provided by including a delta between the average (or maximum over some time period) packet latencies at which weight and credit increases begin and end. Additionally, when the packet latency exceeds a higher threshold, weights or credits may be further increased. In a further embodiment, a queue's weights or credits may be adjusted in part or in whole by a factor proportional to packet latency.

In an embodiment, a queue's weights or credits may be adjusted based upon packet egress rate. If the average (or minimum over some time period) egress rate for a queue serving, for instance, a video or VoIP stream drops below a prescribed acceptable level, weights or credits may be dynamically increased by an additional factor until the egress rate rises above the prescribed acceptable level, at which point the increase in weights or credits is no longer applied. The additional factor may be in itself application specific, for instance with a different additional factor being applied for video than for voice, or may be dependent on the data rate of the service. In some embodiments, hysteresis is provided by including a delta between the average (or minimum over some time period) egress rates at which weight and credit increases begin and end. Additionally, when the egress rate drops below an even lower threshold, weights or credits may be further increased. In a further embodiment, a queue's weights or credits may be adjusted in part or in whole by a factor inversely proportional to egress rate.

In rapidly changing RF environments, such as in a mobile network with adaptive modulation and coding, additional factors may be used to adjust the weights and credits rapidly based on airlink factors. When a user equipment has good receive signal quality for transmission from a base station, the base station, such as an LTE eNodeB, may transmit data to the user equipment at a higher data rate and/or with higher likelihood of successful reception. Likewise, when the base station has good receive quality for transmissions from the user equipment, the user equipment may transmit data to the base station at a higher data rate and/or with higher likelihood of successful reception. If the signal quality is observed to be highly variable, an additional factor can be applied to increase weights for a particular user equipment's data streams when the signal quality is good between the base station and that user equipment and decrease weights when the signal quality is poor, thereby providing the bandwidth to data streams for a second user equipment. The adjustment may be application specific. For instance, the weight for a queue containing video may have an additional factor applied to ensure optimal use of good signal quality, while a delay and error tolerant service, such as email, for the same user equipment, may have a different or no additional factor applied, relying more on retries built into protocols such as TCP or the LTE protocol stack.

In addition to the additional factors that may be applied to weights or credits in response to the environmental factors described above, weights and credits or the application factors which modify them may be further modified based on knowledge of the transport protocols used. For instance, a service that has one or more retry mechanisms available such as TCP retries, LTE acknowledged mode, automatic retry requests (ARQ), or hybrid-ARQ (HARQ) may have different additional factors applied for the life of the data stream or dynamically in response to such environmental factors as signal quality and discard rate (e.g., due to congestion).

In an embodiment, the average bit rate of a data stream may be detected or estimated using techniques described above. Other methods may also be available depending upon the application. HTTP streaming, such as Microsoft HTTP smooth streaming, Apple HTTP Live Streaming, Adobe HTTP Dynamic Streaming and MPEG/3GPP Dynamic Adaptive Streaming over HTTP (DASH), is one class of applications that supports video streaming of varying bit rate. In HTTP streaming, each video bitstream is generated as a collection of independently decodable movie fragments by the encoder. The video fragments belonging to bitstreams of different bit rates are aligned in playback time. The information about bitstreams, such as the average bit rate of each bitstream and the play time duration of each fragment, is sent to the video client (which may be a user equipment) at the beginning of a session in one or more files which are commonly referred to as playlist files or manifest files. This information may be detected by a network node such as a base station. In HTTP streaming of a live event, the playlist files or manifest files may be applicable to certain periods of the presentation, and the client needs to fetch new playlist files or manifest files to get updated information about the bitstreams and fragments in bitstreams.

Since the client has the information about bitstreams and fragments that it will play, it will fetch the fragments from bitstreams of different bit rates based on its current estimation of channel conditions. For example, due to variation in perceived channel conditions, a video client in a user equipment may fetch the first fragment from the bitstream of high bit rate, and the second fragment from the bitstream of low bit rate, and the next two fragments from the bitstream of medium bit rate. The channel conditions are often estimated by the video client based on information such as the time spent transporting the last fragment or multiple previous fragments and the size of these fragments. One deficiency of this approach is that the video client may not react fast enough to rapidly changing channel conditions. In one embodiment, the wireless access node, such as a base station, signals the current channel conditions to the video client, so the client can have more accurate information about the channel conditions and request the next fragment or the following fragments accordingly. In an alternative embodiment, the client may receive information regarding current channel conditions from the physical layer implementation, for instance transmitter receiver module 279 of the station of FIG. 2B.

In one embodiment, the packet inspection module 410 (FIGS. 4A, 4C) or the enhanced packet inspection module 410' (FIGS. 4B, 4C) detects the presence of the HTTP streaming session, and keeps copies of the playlist and manifest files. In one embodiment, the packet inspection module estimates the bit rate of the data stream for some period of time by detecting which fragments the client requests to fetch and actual times spent transferring the fragments.

Based on the dynamically calculated or estimated bit rate for a data stream, the weights or credits for a queue may be modified. In an embodiment, the dynamically calculated or estimated bit rate is compared to the queue egress rate and the queue's weights or credits are adjusted by the techniques described above. Additionally, in a case where a data stream was queued in a scheduling group scheduled by a weight based scheduling algorithm such as WFQ or WRR where weights were not based directly on bit rate, the data stream's queue may be moved to another scheduling group using a credit-based scheduling technique, such as PFS, basing credits on bit rates.

The packet inspection module 410 may compare the estimated bit rate of a specific application with the available channel bandwidth for transmission from the associated station. The instantaneous available bandwidth for transmission may be higher than the bit rate of the input traffic from a particular application. For instance, an LTE base station using 20 MHz channels operating in 2×2 multiple-input, multiple-output (MIMO) mode has an instantaneous data rate of approximately 150 Mbps while a streaming video may have an average data rate of 2 Mbps and a peak data rate of 4 Mbps. In one embodiment, the wireless access node may buffer the data of an application and modify scheduler parameters to affect the instantaneous data rate and burst durations in advantageous ways.

Figure 13:
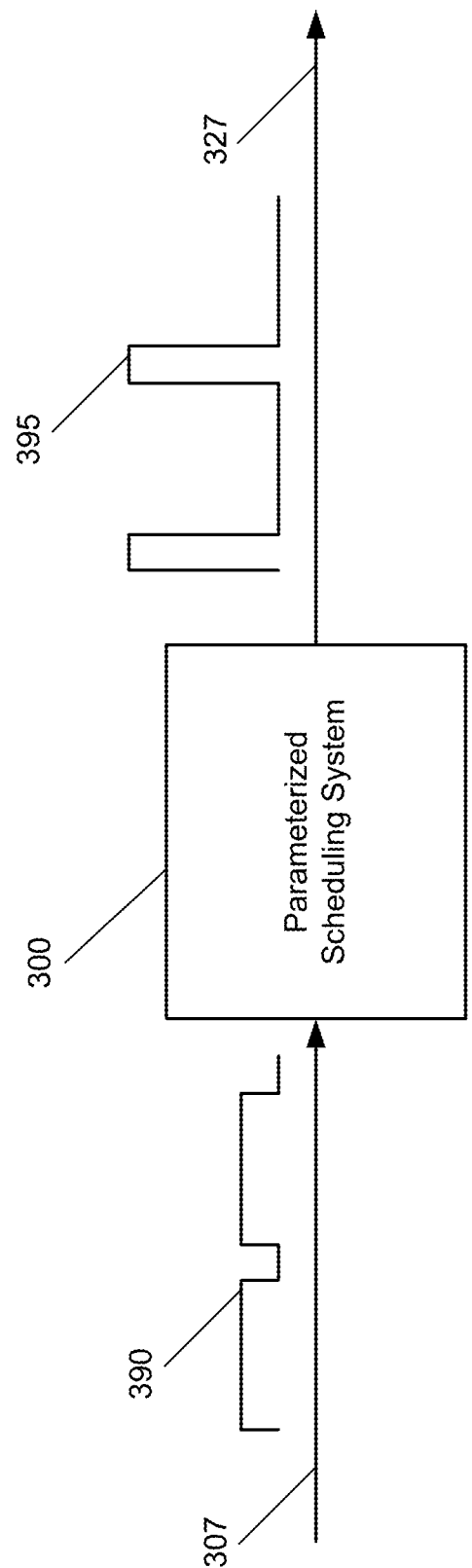
FIG. 13 is a diagram illustrating traffic shaping by a parameterized scheduling system with enhanced packet classification and queuing according to an embodiment.

FIG. 13 illustrates an example of traffic shaping by a parameterized scheduling system. The parameterized scheduling system 300 (FIG. 3) receives incoming traffic 307 from an input communication link and transmits outgoing traffic 327 on an output communication link. In the example illustrated in FIG. 13, the incoming traffic 307 contains traffic from one or more applications. A portion of this traffic belongs to a data stream. The packet inspection module 410 (or enhanced packet inspection module 410') of the parameterized scheduling system 300 may detect the packets from the data stream and additionally detect an incoming traffic pattern 390 corresponding to packet transfer burst durations and bit rates. The parameterized scheduling system 300 may modify a scheduling parameter (or parameters) to control characteristics of the outgoing traffic 327. For example, the parameterized scheduling system 300 may change a window over which other scheduler parameters, such as accumulated credits, are updated. This allows better alignment of allocation of bandwidth for outgoing packet bursts with the availability of incoming packet bursts needing transmission over the output communication link. This can be combined with modification of scheduler parameters, such as weights and credits, based on application class, specific application, modulation and coding scheme, or some combination.

Modifications of scheduler parameter may be combined to alter the outgoing traffic pattern 395 for the application to have packet transfer bursts that have high instantaneous bit rate and short duration relative to the incoming traffic pattern 390. This may have many benefits. If modulation and coding schemes are rapidly changing, for instance due to mobility, the scheduler parameters may be modified to give preference to bursting the data at high rates during periods of good signal quality, effectively increasing the total system capacity through use of more efficient modulation and coding schemes for more of the data. It may also be desirable to increase the amount of idle time between two bursts, thereby making it possible to put the receiver at the user equipment into sleep mode for a longer time. This may be used to reduce the amount of time the user equipment receiver must be turned on to receive the data from the wireless access node. This can reduce the power consumption of the user equipment. This can be implemented, for example, to align with Discontinuous Reception (DRX) protocol in 3GPP HSDPA or LTE.

Those of skill in the art will appreciate that even though the above functions are generally described as if they reside in a station such as a base station, in some embodiments the functions may reside in other devices. Any device that performs queuing and scheduling may perform the algorithms. For instance a user equipment may perform the described algorithms when deciding how to schedule packets for uplink transmission or for deciding for which queues to request bandwidth uplink from the base station. A device or module that schedules bandwidth on the backhaul to or from a base station may perform the algorithms.

In one embodiment, the functions are distributed. For instance, referring to FIG. 5, the gateway 540 may detect the dynamic presence and subsequent absence of an application class, specific application, or transport protocol on a bearer, connection, or stream. The gateway 540 may signal that information to the radio access network (for example a base station) 550 to use in calculating AFs or additional factors. In another embodiment, the gateway 540 calculates application factors or enhanced weights or credits and signals them to the radio access network 550. In an embodiment, the radio access network 550 signals information such as buffer occupancy, signal quality, discard rates, etc. to the gateway 540, and the gateway 540 uses such information to schedule its egress traffic. Additionally, the gateway 540 may combine information from the radio access network 550 to calculate additional factors or enhanced weights or credits and signal them to the radio access network 550.

In an embodiment, information such as AF, alone or in combination with additional factors such as buffer occupancy, signal quality, discard rates, estimated bit rates, etc. may be used to compute an adjustment to the GBR setting typically established during the setup of a logical channel between network endpoints. For example, in an LTE network, an eNB scheduling parameter calculation module 335 may use the AF calculated for a particular data stream to request a modification of the corresponding data bearer's GBR by sending a message to the EPC packet gateway. In an alternate embodiment, an eNB scheduling parameter calculation module 335 may in addition request a QCI change, for example from a QCI which does not support GBR bearers to a QCI which does. Such requests may be made one or multiple times during the life of a data stream, and may be used alone or in combination with techniques described above, depending on conditions present at the eNB.

Those of skill will appreciate that the various illustrative logical blocks, modules, controllers, units, and algorithm steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block or step is for ease of description. Specific functions or steps can be moved from one unit, module or block without departing from the invention.

The various illustrative logical blocks, units, steps and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

What is claimed is:

1. A method for operating a communication device for scheduling transmission of data packets, the method comprising:
   receiving a plurality of data packets from a communication network;
   determining at least one application that is associated with at least one of the data packets;
   inserting each of the data packets into one of a plurality of data queues;
   determining a scheduler parameter for one or more of the plurality of data queues, the scheduler parameter corresponding to the at least one application;
   scheduling the data packets from one or more of the plurality of data queues to an output queue based at least in part on the scheduler parameter for the one or more of the plurality of data queues; and
   transmitting the data packets from the output queue to the communication network.

2. The method of claim 1, wherein the scheduler parameter for the one or more of the plurality of data queues is further based at least in part on an additional factor based on a characteristic of the one or more of the plurality of data queues.

3. The method of claim 2, wherein the additional factor based on the characteristic of the one or more of the plurality of data queues comprises a multiplicative factor of a factor based on the at least one application associated with the at least one of the data packets.

4. The method of claim 2, wherein the additional factor based on the characteristic of the one or more of the plurality of data queues comprises an additive factor to a factor based on the at least one application associated with the at least one of the data packets.

5. The method of claim 2, wherein the characteristic of the one or more of the plurality of data queues comprises a depth of one of the one or more of the plurality of data queues.

6. The method of claim 2, wherein the characteristic of the one or more of the plurality of data queues comprises a discard rate of one of the one or more of the plurality of data queues.

7. The method of claim 2, wherein the characteristic of the one or more of the plurality of data queues comprises a latency of one of the one or more of the plurality of data queues.

8. The method of claim 2, wherein the characteristic of the one or more of the plurality of data queues comprises an egress rate of one of the one or more of the plurality of data queues.

9. The method of claim 1, further comprising determining a bit rate of data packets associated with the at least one application, and wherein the scheduler parameter for the one or more of the plurality of data queues is further based at least in part on an egress rate of one of the data queues associated with the at least one application compared to the bit rate of the data packets associated with the at least one application.

10. The method of claim 1, wherein the scheduler parameter for the one or more of the plurality of data queues is further based at least in part on an additional factor based on a characteristic of a communication link used for communicating the data packets.

11. The method of claim 10, wherein the characteristic of the communication link used for communicating the data packets comprises a signal quality.

12. The method of claim 10, wherein the at least one application includes a video stream, and the method further comprises transmitting information about the characteristic of the communication link used for communicating the data packets to a second communication device for use by the second communication device in selecting fragments of the video stream.

13. The method of claim 1, wherein the scheduler parameter for the one or more of the plurality of data queues is further based at least in part on an additional factor based on a protocol used for communicating the data packets.

14. The method of claim 1, further comprising transmitting information about the at least one application to a second communication device for use in scheduling transmission of data packets from the second communication device.

15. The method of claim 2, further comprising transmitting information about the additional factor to a second communication device for use in scheduling transmission of data packets from the second communication device.

16. The method of claim 2, further comprising detecting a traffic pattern in the plurality of data packets, and wherein the scheduler parameter for the one or more of the plurality of data queues is further based at least in part on the detected traffic pattern.

17. The method of claim 16, wherein the scheduler parameter for the one or more of the plurality of data queues is determined to increase an idle time in between the data packets transmitted from the output queue to the communication network.

18. A communication device, comprising:
a classification and queuing module configured to receive a plurality of data packets and to output each of the data packets into one of a plurality of data queues, the classification and queuing module comprising a packet inspection module configured to analyze attributes of the data packets, to determine at least one application associated with at least one of the data packets, and to output information about the at least one application;
a scheduler parameter calculation module configured to calculate and output a scheduler parameter for one or more of the plurality of data queues, the scheduler parameter corresponding to the at least one application; and
a scheduler module configured to select the data packets from one or more of the plurality of data queues in an order based at least in part on the scheduler parameter for the one or more of the plurality of data queues and to insert the selected data packets into an output queue for transmission over a physical communication layer.

19. The communication device of claim 18, wherein the scheduler parameter for the one or more of the plurality of data queues is further based at least in part on an additional factor based on a characteristic of the one or more of the plurality of data queues.

20. The communication device of claim 19, wherein the characteristic of the one or more of the plurality of data queues comprises a depth of one of the one or more of the plurality of data queues.

21. The communication device of claim 19, wherein the characteristic of the one or more of the plurality of data queues comprises a discard rate of one of the one or more of the plurality of data queues.

22. The communication device of claim 19, wherein the characteristic of the one or more of the plurality of data queues comprises a latency of one of the one or more of the plurality of data queues.

23. The communication device of claim 19, wherein the characteristic of the one or more of the plurality of data queues comprises an egress rate of one of the one or more of the plurality of data queues.

24. The communication device of claim 18, wherein the scheduler parameter for the one or more of the plurality of data queues is further based at least in part on an additional factor based on a characteristic of the physical communication layer.

25. The communication device of claim 18, wherein the scheduler parameter for the one or more of the plurality of data queues is further based at least in part on an additional factor based on a protocol used for communicating the data packets over the physical communication layer.

* * * * *